US012516301B2

(12) United States Patent
Gray et al.

(10) Patent No.: US 12,516,301 B2
(45) Date of Patent: Jan. 6, 2026

(54) OPTIMIZED SUMF1 GENES AND EXPRESSION CASSETTES AND THEIR USE

(71) Applicant: The University of North Carolina at Chapel Hill, Chapel Hill, NC (US)

(72) Inventors: Steven James Gray, Southlake, TX (US); Rachel Bailey, Trophy Club, TX (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 1105 days.

(21) Appl. No.: 17/606,890

(22) PCT Filed: Apr. 28, 2020

(86) PCT No.: PCT/US2020/030236
§ 371 (c)(1),
(2) Date: Oct. 27, 2021

(87) PCT Pub. No.: WO2020/223215
PCT Pub. Date: Nov. 5, 2020

(65) Prior Publication Data
US 2022/0213450 A1    Jul. 7, 2022

Related U.S. Application Data

(60) Provisional application No. 62/840,114, filed on Apr. 29, 2019.

(51) Int. Cl.
*A61K 48/00* (2006.01)
*A61K 38/44* (2006.01)
*A61P 3/00* (2006.01)
*C12N 9/02* (2006.01)
*C12N 15/86* (2006.01)

(52) U.S. Cl.
CPC ............ *C12N 9/0051* (2013.01); *A61K 38/44* (2013.01); *A61K 48/005* (2013.01); *A61P 3/00* (2018.01); *C12N 15/86* (2013.01); *C12Y 108/03* (2013.01); *C12N 2710/10343* (2013.01); *C12N 2710/16143* (2013.01); *C12N 2750/14143* (2013.01); *C12N 2750/14171* (2013.01); *C12N 2800/22* (2013.01)

(58) Field of Classification Search
CPC .......................... A61K 48/005; C12N 2800/22
See application file for complete search history.

(56) References Cited

U.S. PATENT DOCUMENTS

| | | |
|---|---|---|
| 4,501,729 A | 2/1985 | Boucher et al. |
| 5,399,346 A | 3/1995 | Anderson et al. |
| 5,478,745 A | 12/1995 | Samulski et al. |
| 6,040,183 A | 3/2000 | Ferrari et al. |
| 6,093,570 A | 7/2000 | Ferrari et al. |
| 6,156,303 A | 12/2000 | Russell et al. |
| 7,201,898 B2 | 4/2007 | Monahan et al. |
| 9,636,370 B2 | 5/2017 | McCown et al. |
| 2016/0201039 A1 | 7/2016 | Pungor et al. |
| 2016/0230205 A1 | 8/2016 | Rabuka et al. |
| 2017/0191041 A1 | 7/2017 | Radin |
| 2017/0360960 A1 | 12/2017 | Gray et al. |

FOREIGN PATENT DOCUMENTS

| | | |
|---|---|---|
| WO | 9811244 A2 | 3/1998 |
| WO | 9961601 A2 | 12/1999 |
| WO | 0017377 A2 | 3/2000 |
| WO | 0028004 A1 | 5/2000 |
| WO | 0028061 A2 | 5/2000 |
| WO | 0191803 A2 | 12/2001 |
| WO | 0192551 A2 | 12/2001 |
| WO | 2014136065 A2 | 9/2014 |
| WO | 2018093925 A1 | 5/2018 |

OTHER PUBLICATIONS

Laoharawee et al. (2017) "Prevention of neurocognitive deficiency in mucopolysaccharidosis type II mice by central nervous system-directed, AAV9-mediated iduronate sulfatase gene transfer" Human gene therapy, 28(8), 626-638. (Year: 2017).*
Mccarty, D. M. (2008) "Self-complementary AAV vectors; advances and applications" Molecular therapy, 16(10), 1648-1656. (Year: 2008).*
Choi et al. (2014) "Optimization of AAV expression cassettes to improve packaging capacity and transgene expression in neurons" Molecular brain, 7:17, 10 pages. (Year: 2014).*
Ahrens-Nicklas et al. "Complex care of individuals with Multiple Sulfatase Deficiency: clinical cases and consensus statement" Molecular Genetics and Metabolism, 123(3):337-346 (2018).
Carlson et al. "Function and Structure of a Prokaryotic Formylglycine-generating Enzyme" Journal of Biological Chemistry, 283(29):20117-20125 (2008).
Chao et al. "Several Log Increase in Therapeutic Transgene Delivery by Distinct Adeno-Associated Viral Serotype Vectors" Molecular Therapy, 2(6):619-623 (2000).
Conway et al. "High-titer recombinant adeno-associated virus production utilizing a recombinant herpes simplex virus ype I vector expressing AAV-2 Rep and Cap" Gene Therapy, 6:986-993 (1999).
Cosma et al. "The Multiple Sulfatase Deficiency Gene Encodes an Essential and Limiting Factor for the Activity of Sulfatases" Cell, 113:445-456 (2003).
Dierks et al. "Molecular Basis for Multiple Sulfatase Deficiency and Mechanism for Formylglycine Generation of the Human Formylglycine-Generating Enzyme" Cell, 121(4):541-552 (2005).

(Continued)

*Primary Examiner* — James Joseph Graber
(74) *Attorney, Agent, or Firm* — Myers Bigel, P.A.

(57) ABSTRACT

This invention relates to polynucleotides comprising optimized SUMF1 open reading frame (ORF) sequences, vectors comprising the same, and methods of using the same for deliver) of the ORF to a cell or a subject and to treat disorders associated with aberrant expression of a SUMF1 gene or aberrant activity of a SUMF1 gene product in the subject, such as SUMF1 disease.

19 Claims, 3 Drawing Sheets
Specification includes a Sequence Listing.

(56) References Cited

OTHER PUBLICATIONS

Dierks et al. "Molecular basis of multiple sulfatase deficiency, mucolipidosis II/III and Niemann-Pick C1 disease—Lysosomal storage disorders caused by defects of non-lysosomal proteins" Biochimica et Biophysica Acta, 1793 (4):710-725 (2009).

Dierks et al. "Multiple Sulfatase Deficiency Is Caused by Mutations in the Gene Encoding the Human C(alpha)-Formylglycine Generating Enzyme" Cell, 113(4):435-444 (2003).

Eto et al. "Pathochemistry, Pathogenesis and Enzyme Replacement in Multiple-Sulfatase Deficiency" Enzyme, 38(1-4):273-279 (1987) (Abstract only).

Federici et al. "Robust spinal motor neuron transduction following intrathecal delivery of AAV9 in pigs" Gene Therapy, 19(8):852-859 (2011).

Feng et al. "Progressive Sequence Alignment as a Prerequisite to Correct Phylogenetic Trees" Journal of Molecular Evolution, 25:351-360 (1987).

Gao et al. "Clades of Adeno-Associated Viruses are Widely Disseminated in Human Tissues" Journal of Virology, 78(12):6381-6388 (2004).

Garavelli et al. "Multiple sulfatase deficiency with neonatal manifestation" Italian Journal of Pediatrics, 40:86 (2014).

GenBank Accession No. AF028704 "Adeno-associated virus 6, complete genome" www.ncbi.nlm.nih.gov (3 pages) (Jan. 12, 1998).

GenBank Accession No. AF028705 "Adeno-associated virus 3B, complete genome" www.ncbi.nlm.nih.gov (3 pages) (Jan. 12, 1998).

GenBank Accession No. AF043303 "Adeno-associated virus 2, complete genome" www.ncbi.nlm.nih.gov (4 pages) (May 20, 2010).

GenBank Accession No. AF063497 "Adeno-associated virus 1, complete genome" www.ncbi.nlm.nih.gov (3 pages) (Apr. 27, 1999).

GenBank Accession No. AF288061 "Hamster parvovirus 5' terminal hairpin gene sequence" www.ncbi.nlm.nih.gov (1 bage) (Apr. 13, 2001).

GenBank Accession No. AF513851 "Adeno-associated virus 7 nonstructural protein and capsid protein genes, complete cds" www.ncbi.nlm.nih.gov (3 pages) (Sep. 5, 2002).

GenBank Accession No. AF513852 "Adeno-associated virus 8 nonstructural protein and capsid protein genes, complete cds" www.ncbi.nlm.nih.gov (3 pages) (Sep. 5, 2002).

GenBank Accession No. AH009962 "Hamster parvovirus" www.ncbi.nlm.nih.gov (2 pages) (Aug. 25, 2016).

GenBank Accession No. AX753250 "Sequence 5 from Patent EP1310571" www.ncbi.nlm.nih.gov (2 pages) (Jun. 23, 2003).

GenBank Accession No. AY028223 "B19 virus isolate patient_A.1.1 genomic sequence" www.ncbi.nlm.nih.gov (1 bage) (Apr. 16, 2001).

GenBank Accession No. AY028226 "B19 virus isolate patient_A.2.1 genomic sequence" www.ncbi.nlm.nih.gov (1 bage) (Apr. 16, 2001).

GenBank Accession No. AY530579 "Adeno-associated virus 9 isolate hu.14 capsid protein VP1 (cap) gene, complete cds" www.ncbi.nlm.nih.gov (2 pages) (Jun. 24, 2004).

GenBank Accession No. AY631966 "Adeno-associated virus 11 nonstructural protein and capsid protein genes, complete cds" www.ncbi.nlm.nih.gov (3 pages) (Nov. 30, 2004).

GenBank Accession No. EU285562 "Adeno-associated virus 13 nonstructural protein and capsid protein genes, complete cds" www.ncbi.nlm.nih.gov (3 pages) (Sep. 23, 2008).

GenBank Accession No. J01901 "Adeno-associated virus 2, complete genome" www.ncbi.nlm.nih.gov (3 pages) (Apr. 27, 1993).

GenBank Accession No. J02275 "Minute virus of mice, complete genome" www.ncbi.nlm.nih.gov (5 pages) (May 22, 1995).

GenBank Accession No. NC_000883 "Human parvovirus B19, complete genome" www.ncbi.nlm.nih.gov (4 pages) (Aug. 13, 2018).

GenBank Accession No. NC_001358 "Parvovirus H1, complete genome" www.ncbi.nlm.nih.gov (3 pages) (Feb. 10, 2015).

GenBank Accession No. NC_001401 "Adeno-associated virus—2, complete genome" www.ncbi.nlm.nih.gov (6 pages) (Aug. 13, 2018).

GenBank Accession No. NC_001510 "Minute virus of mice, complete genome" www.ncbi.nlm.nih.gov (5 pages) (Aug. 13, 2018).

GenBank Accession No. NC_001540 "Bovine parvovirus, complete genome" www.ncbi.nlm.nih.gov (4 pages) (Aug. 13, 2018).

GenBank Accession No. NC_001701 "Goose parvovirus, complete genome" www.ncbi.nlm.nih.gov (4 pages) (Aug. 13, 2018).

GenBank Accession No. NC_001729 "Adeno-associated virus—3, complete genome" www.ncbi.nlm.nih.gov (3 pages) (Aug. 13, 2018).

GenBank Accession No. NC_001829 "Adeno-associated virus—4, complete genome" www.ncbi.nlm.nih.gov (3 pages) (Aug. 13, 2018).

GenBank Accession No. NC_001862 "Adeno-associated virus 6, complete genome" www.ncbi.nlm.nih.gov (3 pages) (Jan. 12, 2004).

GenBank Accession No. NC_001863 "Adeno-associated virus 3B, complete genome" www.ncbi.nlm.nih.gov (3 pages) (Jan. 12, 2004).

GenBank Accession No. NC_002077 "Adeno-associated virus—1, complete genome" www.ncbi.nlm.nih.gov (3 pages) (Aug. 13, 2018).

GenBank Accession No. NC_006152 "Adeno-associated virus 5, complete genome" www.ncbi.nlm.nih.gov (3 pages) (Aug. 13, 2018).

GenBank Accession No. NC_006261 "Adeno-associated virus—8, complete genome" www.ncbi.nlm.nih.gov (3 pages) (Aug. 13, 2018).

GenBank Accession No. U89790 "Adeno-associated virus 4, complete genome" www.ncbi.nlm.nih.gov (3 pages) (Aug. 21, 1997).

GenBank Accession No. X01457 "Parvovirus h-1, complete genome" www.ncbi.nlm.nih.gov (3 pages) (Apr. 18, 2005).

Gray et al. "Optimizing Promoters for Recombinant Adeno-Associated Virus-Mediated Gene Expression in the Peripheral and Central Nervous System Using Self-Complementary Vectors" Human Gene Therapy, 22(9):1134-1153 (2011).

Gray et al. "Preclinical Differences of Intravascular AAV9 Delivery to Neurons and Glia: A Comparative Study of Adult Mice and Nonhuman Primates" Molecular Therapy, 19(6):1058-1069 (2011).

International Preliminary Report on Patentability corresponding to International Patent Application No. PCT/US2020/030236 (7 pages) (dated Nov. 11, 2021).

Jaszczuk et al. "Expanding the genetic cause of multiple sulfatase deficiency: A novel SUMF1 variant in a patient displaying a severe late infantile form of the disease" Molecular Genetics and Metabolism, 121(3):252-258 (2017).

Landgrebe et al. "The human SUMF1 gene, required for post-translational sulfatase modification, defines a new gene family which is conserved from pro-to eukaryotes" Gene, 316:47-56 (2003).

Margolskee, R. F. "Epstein-Barr Virus Based Expression Vectors" Current Topics in Microbiology and Immunology, 158:67-95 (1992).

McCarty et al. "Adeno-associated virus terminal repeat (TR) mutant generates self-complementary vectors to overcome the rate-limiting step to transduction in vivo" Gene Therapy, 10:2112-2118 (2003).

McCarty et al. "Self-complementary recombinant adeno-associated virus (scAAV) vectors promote efficient transduction independently of DNA synthesis" Gene Therapy, 8:1248-1254 (2001).

Muzyczka, N. "Use of Adeno-Associated Virus as a General Transduction Vector for Mammalian Cells" Current Topics in Microbiology and Immunology, 158:97-98 (1992).

Nur et al. "Neonatal multiple sulfatase deficiency with a novel mutation and review of the literature" The Turkish Journal of Pediatrics, 56(4):418-422 (2014).

Palombo et al. "Site-Specific Integration in Mammalian Cells Mediated by a New Hybrid Baculovirus-Adeno-Associated Virus Vector" Journal of Virology, 72(6):5025-5034 (1998).

Preusser-Kunze et al. "Molecular characterization of the human Calpha-formylglycine-generating enzyme" The Journal of Biological Chemistry, 280(15):14900-14910 (2005).

Sabourdy et al. "Natural disease history and characterisation of SUMF1 molecular defects in ten unrelated patients with multiple sulfatase deficiency" Orphanet Journal of Rare Diseases, 10:31 (2015).

(56) References Cited

OTHER PUBLICATIONS

Sardiello et al. "Sulfatases and sulfatase modifying factors: an exclusive and promiscuous relationship" Human Molecular Genetics, 14(21):3203-3217 (2005).
Schlotawa et al. "Molecular Analysis of SUMF1 Mutations: Stability and Residual Activity of Mutant Formylglycine-Generating Enzyme Determine Disease Severity in Multiple Sulfatase Deficiency" Human Mutation, 29(1):205 (2007).
Schlotawa et al. "SUMF1 mutations affecting stability and activity of formylglycine generating enzyme predict clinical outcome in multiple sulfatase deficiency" European Journal of Human Genetics, 19(3):253-261 (2011).
Schmidt et al. "A Novel Amino Acid Modification in Sulfatases That Is Defective in Multiple Sulfatase Deficiency" Cell, 82(2):271-278 (1995).
Settembre et al. "Systemic inflammation and neurodegeneration in a mouse model of multiple sulfatase deficiency" Proceedings of the National Academy of Sciences, 104(11):4506-4511 (2007).
Spampanato et al. "Efficacy of a Combined Intracerebral and Systemic Gene Delivery Approach for the Treatment of a Severe Lysosomal Storage Disorder" Molecular Therapy, 19(5):860-869 (2011).
Urabe et al. "Insect Cells as a Factory to Produce Adeno-Associated Virus Type 2 Vectors" Human Gene Therapy, 13:1935-1943 (2002).
Zhang et al. "Recombinant adenovirus expressing adeno-associated virus cap and rep proteins supports production of hightiter recombinant adeno-associated virus" Gene Therapy, 8:704-712 (2001).
Zolotukhin et al. "Recombinant adeno-associated virus purification using novel methods improves infectious titer and yield" Gene Therapy, 6:973-985 (1999).
Fraldi et al. "SUMF1 enhances sulfatase activities in vivo in five sulfatase deficiencies" Biochemical Journal, 403:305-312 (2007).
International Search Report and the Written Opinion of the International Searching Authority corresponding to International Patent Application No. PCT/US2020/030236 (13 pages) (mailed Aug. 12, 2020).
Bailey et al. "Development of scAAV9/SUMF1 gene therapy for multiple sulfatase delivery" Molecular Genetics and Metabolism, 126(2):S27 (2019).
Extended European Search Report corresponding to European Patent Application No. 20798551.6 (11 pages) (dated Dec. 22, 2022).
Laoharawee et al. "Prevention of Neurocognitive Deficiency in Mucopolysaccharidosis Type II Mice by Central Nervous System-Directed, AAV9-Mediated Iduronate Sulfatase Gene Transfer" Human Gene Therapy, 28(8):626-638 (2017).

\* cited by examiner

```
hSUMF1  SQEAGTGAGAGSLAGSCGCGTPQRPGAHGSSAAAHRYSREANAP
MACACA  SEEAGTSAVGGSLAGSCGCGTPQRPGVHGSSGAAHRYSREANAP
   MUS  --EAEAREGAASLAGSCGCGTPQRAGAHGSSAAAQRYSREANAP
RATTUS  --EAEAGEGAVSLAGSCGCGTPQRAGAHGSSAAAQRYSREANAQ
          :     . ********** * .** .:******* hSUMF1  GPVPGERQLAHSKMVPIPAGVFTMGTDDPQIKQDGEAPARRVTI
MACACA  GSVPGERPLAHSKMVPIPAGVFTMGTDDPQIKQDGEAPARRVTI
   MUS  GLTSGPRPLALTKMVPIPAGVFTMGTDDPQIRQDGEAPARRVTV
RATTUS  GLTSGPRSLALTKMVPIPAGVFTMGTDDPQIKQDGEAPARRVTV
        * . *  *  ** .:***************:************:

hSUMF1  DAFYMDAYEVSNTEFEKFVNSTGYLTEAEKFGDSFVFEGMLSEQ
MACACA  DAFYMDAYEVSNAEFEKFVNSTGYLTEAEKFGDSFVFEGMLSEQ
   MUS  DGFYMDAYEVSNADFEKFVNSTGYLTEAEKFGDSFVFEGMLSEQ
   RAT  DAFYMDAYEVSNADFEKFVNSTGYLTEAEKFGDSFVFEGMLSEP
   TUS  *.********::*************************** hSUMF1  VKTNIQQAVAAAPWWLPVKGANWRHPEGPDSTILHRPDHPVLHV
MACACA  VKTNIQQAVAAAPWWLPVKGANWRHPEGPDSTIRHRPDHPVLHV
   MUS  VKTHIHQAVAAAPWWLPVKGANWRHPEGPDSSILHRSNHPVLHV
RATTUS  VKAQIHQAVAAAPWWLPVKGADWRHPEGPDSTILHRSNHPVLHV
        **::*:************.*******:*    :*** hSUMF1  SWNDAVAYCTWAGKRLPTEAEWEYSCRGGLHNRLFPWGNKLQPK
MACACA  SWNDAVAYCTWAGKRLPTEAEWEYSCRGGLHNRLFPWGNKLQPK
   MUS  SWNDAVAYCTWAGKRLPTEAEWEYSCRGGLQNRLFPWGNKLQPK
RATTUS  SWNDAVAYCAWAGKRLPTEAEWEYSCRGGLQNRLFPWGNKLQPK
        *******:***************:************ hSUMF1  GQHYANIWQGEFPVTNTGEDGFQGTAPVDAFPPNGYGLYNIVGN
MACACA  GQHYANIWQGEFPVTNTGEDGFQGTAPVDAFPPNGYGLYNIVGN
   MUS  GQHYANIWQGKFPVSNTGEDGFQGTAPVDAFPPNGYGLYNIVGN
RATTUS  GQHYANIWQGKFPVSNTGEDGFQGTAPVDAFPPNGYGLYNIVGN
        ********.*:***************************** hSUMF1  AWEWTSDWWTVHHSVEETLNPKGPPSGKDRVKKGGSYMCHRSYC
MACACA  AWEWTSDWWTVHHSVEETLNPKGPPSGKDRVKKGGSYMCHRSYC
   MUS  VWEWTSDWWTVHHSVEETFNPKGPTSGKDRVKKGGSYMCHKSYC
RATTUS  AWEWTSDWWTVHHSAEETLNPKGPTSGKDRVKKGGSYMCHKSYC
        .***********.*:***:**********:* hSUMF1  YRYRCAARSQNTPDSSASNLGFRCAADRLPTMD  341
MACACA  YRYRCAARSQNTPDSSASNLGFRCAADHLPTMD  341
   MUS  YRYRCAARSQNTPDSSASNLGFRCAADHLPTAD  339
RATTUS  YRYRCAARSQNTPDSSASNLGFRCAADHLPTAN  339
        ***************************:***  :
```

*FIG. 1*

SEQUENCE LISTING

```
<160> NUMBER OF SEQ ID NOS: 14

<210> SEQ ID NO 1
<211> LENGTH: 1122
<212> TYPE: DNA
<213> ORGANISM: Artificial Sequence
<220> FEATURE:
<223> OTHER INFORMATION: Human codon-optimized SUMF1 open reading frame

<400> SEQUENCE: 1
atggccgccc cagctcttgg actcgtgtgc ggaagatgcc ctgaactcgg actcgtgttg      60
ttgttgctgc tgctgtccct gctgtgcggc gccgccggat cgcaagaagc gggaaccgga     120
gcgggtgccg gatccctggc cgggtcctgt ggttgcggaa caccgcaacg gcccggcgca     180
catggatcca gcgccgctgc gcaccgctac tcccgggaag ctaacgcccc tgggcccgtg     240
cccggggaaa gacagctcgc ccactccaaa atggtgccga tccccgccgg agtgttcact     300
atgggtactg acgacccaca gattaagcag gacggagagg caccagcgcg ccgggtcacc     360
attgacgctt tttacatgga cgcctacgag gtgtcaaaca ctgagttcga gaagttcgtg     420
aactcaaccg gatacctgac cgaggccgaa aagttcggcg actcgttcgt gttcgagggc     480
atgctgtcgg aacaagtcaa gaccaacatc cagcaggccg tggctgcagc cccgtggtgg     540
ctgcccgtga aggggccaa ttggagacac cccgagggcc cagactccac catcctccac     600
cggcctgacc accctgtgct tcacgtgtcc tggaacgatg cagtcgcata ctgcacctgg     660
gccggaaaga ggctgccgac tgaagccgaa tgggaatact cctgccgggg cggcctgcac     720
aaccgcctgt ttccctgggg caacaagctc cagcctaagg gccagcacta cgcgaacatt     780
tggcagggag aattccctgt gaccaacacc ggagaggacg gtttccaagg caccgccccg     840
gtcgatgcgt tcccgccgaa cggttacggc ctctacaaca tcgtggggaa cgcctgggag     900
```

```
tggacgtcgg attggtggac cgtgcaccat agcgtcgaag agactctgaa cccgaaaggg      960
cccccgagcg gaaaggacag agtgaagaag ggaggcagct atatgtgtca tcggtcctac     1020
tgttaccgct accgctgcgc ggcccggagc cagaatactc ccgactcttc cgcgtccaac     1080
ctgggcttcc gctgcgccgc cgataggctg cctaccatgg at                       1122

<210> SEQ ID NO 2
<211> LENGTH: 306
<212> TYPE: DNA
<213> ORGANISM: Artificial Sequence
<220> FEATURE:
<223> OTHER INFORMATION: Chicken beta-actin promoter

<400> SEQUENCE: 2
tacgtattag tcatcgctat taccatggtc gaggtgagcc ccacgttctg cttcactctc       60
cccatctccc cccctcccc accccaatt ttgtatttat ttatttttta attatttgt         120 gcagcgatgg gggcggggg ggggggggg cgcgcgccag gcggggcggg gcggggcgag        180
gggcggggcg gggcgaggcg gagaggtgcg gcggcagcca atcagagcgg cgcgctccga      240
aagtttcctt ttatggcgag gcggcggcgg cggcggccct ataaaaagcg aagcgcgcgg      300
cgggcg                                                                306

<210> SEQ ID NO 3
<211> LENGTH: 136
<212> TYPE: DNA
<213> ORGANISM: Artificial Sequence
<220> FEATURE:
<223> OTHER INFORMATION: Chimeric intron with chicken beta-actin
      splicing donor site and minute virus of mice (MVM) intron splicing
      acceptor site with A deletion

<400> SEQUENCE: 3
ggagtcgctg cgcgctgcct tcgccccgtg ccccgctccg ccgccgcctc gcgccgcccg       60
ccccggctct gactgaccgc gttactccca caggtgagcg ggcgggacgg cccttctcct     120
ccgggctgta attagc                                                     136

<210> SEQ ID NO 4
<211> LENGTH: 137
<212> TYPE: DNA
<213> ORGANISM: Artificial Sequence
<220> FEATURE:
<223> OTHER INFORMATION: Chimeric intron with chicken beta-actin
      splicing donor site and minute virus of mice (MVM) intron splicing
      acceptor site

<400> SEQUENCE: 4
ggagtcgctg cgacgctgcc ttcgccccgt gccccgctcc gccgccgcct cgcgccgccc       60
gccccggctc tgactgaccg cgttactccc acaggtgagc gggcgggacg gcccttctcc     120
tccgggctgt aattagc                                                    137

<210> SEQ ID NO 5
<211> LENGTH: 1881
<212> TYPE: DNA
<213> ORGANISM: Artificial Sequence
<220> FEATURE:
<223> OTHER INFORMATION: CAGGS promoter 1.6kb CMV enhancer, CBA promoter
      and partial 5' UTR

<400> SEQUENCE: 5
gatctgaatt cggatcttca atattggcca ttagccatat tattcattgg ttatatagca       60
```

-continued

```
taaatcaata ttggatattg gccattgcat acgttgtatc tatatcataa tatgtacatt      120
tatattggct catgtccaat atgaccgcca tgttggcatt gattattgac tagttattaa      180
tagtaatcaa ttacggggtc attagttcat agcccatata tggagttccg cgttacataa      240
cttacggtaa atggcccgcc tggctgaccg cccaacgacc cccgcccatt gacgtcaata      300
atgacgtatg ttcccatagt aacgccaata gggactttcc attgacgtca atgggtggag      360
tatttacggt aaactgccca cttggcagta catcaagtgt atcatatgcc aagtccgccc      420
cctattgacg tcaatgacgg taaatggccc gcctggcatt atgcccagta catgacctta      480
cgggactttc ctacttggca gtacatctac gtattagtca tcgctattac catggtcgag      540
gtgagcccca cgttctgctt cactctcccc atctcccccc cctccccacc cccaattttg      600
tatttattta ttttttaatt attttgtgca gcgatggggg cggggggggg ggggggcgc       660
gcgccaggcg gggcggggcg gggcgagggg cggggcgggg cgaggcggag aggtgcggcg      720
gcagccaatc agagcggcgc gctccgaaag tttccttttα tggcgaggcg gcggcggcgg      780
cggccctata aaaagcgaag cgcgcggcgg gcgggagtcg ctgcgacgct gccttcgccc      840
cgtgccccgc tccgccgccg cctcgcgccg cccgccccgg ctctgactga ccgcgttact      900
cccacaggtg agcgggcggg acggcccttc tcctccgggc tgtaattagc gcttggttta      960
atgacggctt gtttcttttc tgtggctgcg tgaaagcctt gaggggctcc gggagggccc     1020
tttgtgcggg gggagcggc tcgggggggtg cgtgcgtgtg tgtgtgcgtg gggagcgccg    1080
cgtgcggccc gcgctgcccg gcggctgtga gcgctgcggg cgcggcgcgg ggctttgtgc     1140
gctccgcagt gtgcgcgagg ggagcgcggc cgggggcggt gccccgcggt gcggggggg     1200
ctgcgagggg aacaaaggct gcgtgcgggg tgtgtgcgtg ggggggtgag caggggtat      1260
gggcgcggcg gtcgggctgt aaccccccc tgcacccccc tccccgagtt gctgagcacg     1320
gcccggcttc gggtgcgggg ctccgtacgg ggcgtggcgc ggggctcgcc gtgccgggcg     1380
gggggtggcg gcaggtgggg gtgccgggcg ggcgggcc gcctcgggcc ggggagggct      1440
cgggggaggg gcgcggcggc cccggagcg ccggcggctg tcgaggcgcg gcgagccgca     1500
gccattgcct tttatggtaa tcgtgcgaga gggcgcaggg acttactttg tcccaaatct    1560
gtgcggagcc gaaatctggg aggcgccgcc gcacccccctc tagcgggcgc ggggcgaagc    1620
ggtgcggcgc cggcaggaag gaaatgggcg ggagggcct tcgtgcgtcg ccgcgccgcc    1680
gtcccctttcct ccctctccag cctcggggct gtccgcgggg ggacggctgc cttcgggggg    1740
gacggggcag ggcggggttc ggcttctggc gtgtgaccgg cggctctaga gcctctgcta     1800
accatgttca tgccttcttc ttttttcctac agctcctggg caacgtgctg gttattgtgc    1860
tgtctcatca ttttggcaaa g                                              1881
```

<210> SEQ ID NO 6
<211> LENGTH: 256
<212> TYPE: DNA
<213> ORGANISM: Artificial Sequence
<220> FEATURE:
<223> OTHER INFORMATION: CMV enhancer

<400> SEQUENCE: 6

```
tacataactt acggtaaatg gcccgcctgg ctgaccgccc aacgaccccc gcccattgac       60
gtcaatagta acgccaatag ggactttcca ttgacgtcaa tgggtggagt atttacggta      120
aactgcccac ttggcagtac atcaagtgta tcatatgcca agtacgcccc ctattgacgt     180
caatgacggt aaatggcccg cctggcattg tgcccagtac atgaccttat ggactttcc     240
```

```
tacttggcag tacatc                                                      256

<210> SEQ ID NO 7
<211> LENGTH: 48
<212> TYPE: DNA
<213> ORGANISM: Artificial Sequence
<220> FEATURE:
<223> OTHER INFORMATION: Synthetic polyadenylation signal (SpA)

<400> SEQUENCE: 7
aataaagagc tcagatgcat cgatcagagt gtgttggttt tttgtgtg                    48

<210> SEQ ID NO 8
<211> LENGTH: 143
<212> TYPE: DNA
<213> ORGANISM: Artificial Sequence
<220> FEATURE:
<223> OTHER INFORMATION: SV40 polyadenylation signal (SV40pA)

<400> SEQUENCE: 8
agacatgata agatacattg atgagtttgg acaaaccaca actagaatgc agtgaaaaaa        60
atgctttatt tgtgaaattt gtgatgctat tgctttattt gtaaccatta taagctgcaa       120
taaacaagtt aacaacaaca att                                              143

<210> SEQ ID NO 9
<211> LENGTH: 123
<212> TYPE: DNA
<213> ORGANISM: Artificial Sequence
<220> FEATURE:
<223> OTHER INFORMATION: SV40 polyadenylation signal (SV40pA)

<400> SEQUENCE: 9
tgtttattgc agcttataat ggttacaaat aaagcaatag catcacaaat ttcacaaata        60
aagcattttt ttcactgcat tctagttgtg gtttgtccaa actcatcaat gtatcttatc       120
atg                                                                    123

<210> SEQ ID NO 10
<211> LENGTH: 2124
<212> TYPE: DNA
<213> ORGANISM: Artificial Sequence
<220> FEATURE:
<223> OTHER INFORMATION: Human SUMF1 expression cassette excluding ITRs

<400> SEQUENCE: 10
ggttcggtac ccgttacata acttacggta aatggcccgc ctggctgacc gcccaacgac        60
ccccgcccat tgacgtcaat agtaacgcca atagggactt tccattgacg tcaatgggtg       120
gagtatttac ggtaaactgc ccacttggca gtacatcaag tgtatcatat gccaagtacg       180
ccccctattg acgtcaatga cggtaaatgg cccgcctggc attgtgccca gtacatgacc       240
ttatgggact ttcctacttg gcagtacatc tacgtattag tcatcgctat taccatggtc       300
gaggtgagcc ccacgttctg cttcactctc cccatctccc ccccctcccc accccccaatt     360 ttgtatttat ttattttta attattttgt gcagcgatgg gggcggggggg ggggggggg       420 cgcgcgccag gcggggcggg gcggggcgag gggcggggcg gggcgaggcg gagaggtgcg       480
gcggcagcca atcagagcgg cgcgctccga aagtttcctt ttatggcgag gcggcggcgg       540
cggcggccct ataaaaagcg aagcgcgcgg cgggcgggag tcgctgcgcg ctgccttcgc       600
cccgtgcccc gctccgccgc cgcctcgcgc cgcccgcccc ggctctgact gaccgcgtta      660
```

```
ctcccacagg tgagcgggcg ggacggccct tctcctccgg gctgtaatta gctgagcaag      720
aggtaagggt ttaagggatg gttggttggt ggggtattaa tgtttaatta cctggagcac      780
ctgcctgaaa tcactttttt tcaggttgga ccggttccgg agccaccatg gccgcccag       840
ctcttggact cgtgtgcgga agatgccctg aactcggact cgtgttgttg ttgctgctgc      900
tgtccctgct gtgcggcgcc gccggatcgc aagaagcggg aaccggagcg ggtgccggat      960
ccctggccgg gtcctgtggt tgcggaacac cgcaacggcc cggcgcacat ggatccagcg     1020
ccgctgcgca ccgctactcc cgggaagcta acgcccctgg gcccgtgccc ggggaaagac     1080
agctcgccca ctccaaaatg gtgccgatcc ccgccggagt gttcactatg ggtactgacg     1140
acccacagat taagcaggac ggagaggcac cagcgcgccg ggtcaccatt gacgcttttt     1200
acatggacgc ctacgaggtg tcaaacactg agttcgagaa gttcgtgaac tcaaccggat     1260
acctgaccga ggccgaaaag ttcggcgact cgttcgtgtt cgagggcatg ctgtcggaac     1320
aagtcaagac caacatccag caggccgtgg ctgcagcccc gtggtggctg cccgtgaagg     1380
gggccaattg gagacacccc gagggcccag actccaccat cctccaccgg cctgaccacc     1440
ctgtgcttca cgtgtcctgg aacgatgcag tcgcatactg cacctgggcc ggaaagaggc     1500
tgccgactga agccgaatgg gaatactcct gccggggcgg cctgcacaac cgcctgtttc     1560
cctggggcaa caagctccag cctaagggcc agcactacgc gaacatttgg cagggagaat     1620
tccctgtgac caacaccgga gaggacggtt ccaaggcac cgccccggtc gatgcgttcc      1680
cgccgaacgg ttacggcctc tacaacatcg tggggaacgc ctgggagtgg acgtcggatt     1740
ggtggaccgt gcaccatagc gtcgaagaga ctctgaaccc gaaagggccc ccgagcggaa     1800
aggacagagt gaagaaggga ggcagctata tgtgtcatcg gtcctactgt taccgctacc     1860
gctgcgcggc ccggagccag aatactcccg actcttccgc gtccaacctg gcttccgct     1920
gcgccgccga taggctgcct accatggatt gataggcggc gcggagctc tcgagagaca      1980
tgataagata cattgatgag tttggacaaa ccacaactag aatgcagtga aaaaaatgct     2040
ttatttgtga aatttgtgat gctattgctt tatttgtaac cattataagc tgcaataaac     2100
aagttaacaa caacaattac gcgt                                            2124
```

<210> SEQ ID NO 11
<211> LENGTH: 341
<212> TYPE: PRT
<213> ORGANISM: Artificial Sequence
<220> FEATURE:
<223> OTHER INFORMATION: hSUMF1

<400> SEQUENCE: 11

```
Ser Gln Glu Ala Gly Thr Gly Ala Gly Ala Gly Ser Leu Ala Gly Ser
1               5                   10                  15

Cys Gly Cys Gly Thr Pro Gln Arg Pro Gly Ala His Gly Ser Ser Ala
                20                  25                  30

Ala Ala His Arg Tyr Ser Arg Glu Ala Asn Ala Pro Gly Pro Val Pro
            35                  40                  45

Gly Glu Arg Gln Leu Ala His Ser Lys Met Val Pro Ile Pro Ala Gly
        50                  55                  60

Val Phe Thr Met Gly Thr Asp Asp Pro Gln Ile Lys Gln Asp Gly Glu
65                  70                  75                  80

Ala Pro Ala Arg Arg Val Thr Ile Asp Ala Phe Tyr Met Asp Ala Tyr
                85                  90                  95

Glu Val Ser Asn Thr Glu Phe Glu Lys Phe Val Asn Ser Thr Gly Tyr
```

```
                    100                 105                 110
Leu Thr Glu Ala Glu Lys Phe Gly Asp Ser Phe Val Phe Glu Gly Met
            115                 120                 125

Leu Ser Glu Gln Val Lys Thr Asn Ile Gln Gln Ala Val Ala Ala
        130                 135                 140

Pro Trp Trp Leu Pro Val Lys Gly Ala Asn Trp Arg His Pro Glu Gly
145                 150                 155                 160

Pro Asp Ser Thr Ile Leu His Arg Pro Asp Pro Val Leu His Val
                165                 170                 175

Ser Trp Asn Asp Ala Val Ala Tyr Cys Thr Trp Ala Gly Lys Arg Leu
                180                 185                 190

Pro Thr Glu Ala Glu Trp Glu Tyr Ser Cys Arg Gly Leu His Asn
            195                 200                 205

Arg Leu Phe Pro Trp Gly Asn Lys Leu Gln Pro Lys Gly Gln His Tyr
            210                 215                 220

Ala Asn Ile Trp Gln Gly Glu Phe Pro Val Thr Asn Thr Gly Glu Asp
225                 230                 235                 240

Gly Phe Gln Gly Thr Ala Pro Val Asp Ala Phe Pro Pro Asn Gly Tyr
                245                 250                 255

Gly Leu Tyr Asn Ile Val Gly Asn Ala Trp Glu Trp Thr Ser Asp Trp
                260                 265                 270

Trp Thr Val His His Ser Val Glu Glu Thr Leu Asn Pro Lys Gly Pro
                275                 280                 285

Pro Ser Gly Lys Asp Arg Val Lys Lys Gly Ser Tyr Met Cys His
        290                 295                 300

Arg Ser Tyr Cys Tyr Arg Tyr Arg Cys Ala Ala Arg Ser Gln Asn Thr
305                 310                 315                 320

Pro Asp Ser Ser Ala Ser Asn Leu Gly Phe Arg Cys Ala Ala Asp Arg
                325                 330                 335

Leu Pro Thr Met Asp
            340

<210> SEQ ID NO 12
<211> LENGTH: 341
<212> TYPE: PRT
<213> ORGANISM: Macaca fascicularis

<400> SEQUENCE: 12

Ser Glu Glu Ala Gly Thr Ser Ala Val Gly Gly Ser Leu Ala Gly Ser
1               5                   10                  15

Cys Gly Cys Gly Thr Pro Gln Arg Pro Gly Val His Gly Ser Ser Gly
                20                  25                  30

Ala Ala His Arg Tyr Ser Arg Glu Ala Asn Ala Pro Gly Ser Val Pro
            35                  40                  45

Gly Glu Arg Pro Leu Ala His Ser Lys Met Val Pro Ile Pro Ala Gly
        50                  55                  60

Val Phe Thr Met Gly Thr Asp Asp Pro Gln Ile Lys Gln Asp Gly Glu
65                  70                  75                  80

Ala Pro Ala Arg Arg Val Thr Ile Asp Ala Phe Tyr Met Asp Ala Tyr
                85                  90                  95

Glu Val Ser Asn Ala Glu Phe Glu Lys Phe Val Asn Ser Thr Gly Tyr
                100                 105                 110

Leu Thr Glu Ala Glu Lys Phe Gly Asp Ser Phe Val Phe Glu Gly Met
            115                 120                 125
```

```
Leu Ser Glu Gln Val Lys Thr Asn Ile Gln Gln Ala Val Ala Ala
            130                 135                 140

Pro Trp Trp Leu Pro Val Lys Gly Ala Asn Trp Arg His Pro Glu Gly
145                 150                 155                 160

Pro Asp Ser Thr Ile Arg His Arg Pro Asp His Pro Val Leu His Val
                165                 170                 175

Ser Trp Asn Asp Ala Val Ala Tyr Cys Thr Trp Ala Gly Lys Arg Leu
                180                 185                 190

Pro Thr Glu Ala Glu Trp Glu Tyr Ser Cys Arg Gly Leu His Asn
                195                 200                 205

Arg Leu Phe Pro Trp Gly Asn Lys Leu Gln Pro Lys Gly Gln His Tyr
    210                 215                 220

Ala Asn Ile Trp Gln Gly Glu Phe Pro Val Thr Asn Thr Gly Glu Asp
225                 230                 235                 240

Gly Phe Gln Gly Thr Ala Pro Val Asp Ala Phe Pro Asn Gly Tyr
                245                 250                 255

Gly Leu Tyr Asn Ile Val Gly Asn Ala Trp Glu Trp Thr Ser Asp Trp
                260                 265                 270

Trp Thr Val His His Ser Val Glu Glu Thr Leu Asn Pro Lys Gly Pro
    275                 280                 285

Pro Ser Gly Lys Asp Arg Val Lys Lys Gly Gly Ser Tyr Met Cys His
290                 295                 300

Arg Ser Tyr Cys Tyr Arg Tyr Arg Cys Ala Ala Arg Ser Gln Asn Thr
305                 310                 315                 320

Pro Asp Ser Ser Ala Ser Asn Leu Gly Phe Arg Cys Ala Ala Asp His
                325                 330                 335

Leu Pro Thr Met Asp
                340

<210> SEQ ID NO 13
<211> LENGTH: 339
<212> TYPE: PRT
<213> ORGANISM: Mus musculus

<400> SEQUENCE: 13

Glu Ala Glu Ala Arg Glu Gly Ala Ala Ser Leu Ala Gly Ser Cys Gly
1               5                   10                  15

Cys Gly Thr Pro Gln Arg Ala Gly Ala His Gly Ser Ser Ala Ala Ala
                20                  25                  30

Gln Arg Tyr Ser Arg Glu Ala Asn Ala Pro Gly Leu Thr Ser Gly Pro
            35                  40                  45

Arg Pro Leu Ala Leu Thr Lys Met Val Pro Ile Pro Ala Gly Val Phe
50                  55                  60

Thr Met Gly Thr Asp Asp Pro Gln Ile Arg Gln Asp Gly Glu Ala Pro
65                  70                  75                  80

Ala Arg Arg Val Thr Val Asp Gly Phe Tyr Met Asp Ala Tyr Glu Val
                85                  90                  95

Ser Asn Ala Asp Phe Glu Lys Phe Val Asn Ser Thr Gly Tyr Leu Thr
                100                 105                 110

Glu Ala Glu Lys Phe Gly Asp Ser Phe Val Phe Glu Gly Met Leu Ser
            115                 120                 125

Glu Gln Val Lys Thr His Ile His Gln Ala Val Ala Ala Ala Pro Trp
    130                 135                 140

Trp Leu Pro Val Lys Gly Ala Asn Trp Arg His Pro Glu Gly Pro Asp
145                 150                 155                 160
```

Ser Ser Ile Leu His Arg Ser Asn His Pro Val Leu His Val Ser Trp
            165                 170                 175

Asn Asp Ala Val Ala Tyr Cys Thr Trp Ala Gly Lys Arg Leu Pro Thr
            180                 185                 190

Glu Ala Glu Trp Glu Tyr Ser Cys Arg Gly Gly Leu Gln Asn Arg Leu
            195                 200                 205

Phe Pro Trp Gly Asn Lys Leu Gln Pro Lys Gly Gln His Tyr Ala Asn
210                 215                 220

Ile Trp Gln Gly Lys Phe Pro Val Ser Asn Thr Gly Glu Asp Gly Phe
225                 230                 235                 240

Gln Gly Thr Ala Pro Val Asp Ala Phe Pro Pro Asn Gly Tyr Gly Leu
            245                 250                 255

Tyr Asn Ile Val Gly Asn Val Trp Glu Trp Thr Ser Asp Trp Trp Thr
            260                 265                 270

Val His His Ser Val Glu Glu Thr Phe Asn Pro Lys Gly Pro Thr Ser
            275                 280                 285

Gly Lys Asp Arg Val Lys Lys Gly Gly Ser Tyr Met Cys His Lys Ser
            290                 295                 300

Tyr Cys Tyr Arg Tyr Arg Cys Ala Ala Arg Ser Gln Asn Thr Pro Asp
305                 310                 315                 320

Ser Ser Ala Ser Asn Leu Gly Phe Arg Cys Ala Ala Asp His Leu Pro
            325                 330                 335

Thr Ala Asp

<210> SEQ ID NO 14
<211> LENGTH: 339
<212> TYPE: PRT
<213> ORGANISM: Rattus norvegicus

<400> SEQUENCE: 14

Glu Ala Glu Ala Gly Glu Gly Ala Val Ser Leu Ala Gly Ser Cys Gly
1               5                   10                  15

Cys Gly Thr Pro Gln Arg Ala Gly Ala His Gly Ser Ser Ala Ala Ala
            20                  25                  30

Gln Arg Tyr Ser Arg Glu Ala Asn Ala Gln Gly Leu Thr Ser Gly Pro
            35                  40                  45

Arg Ser Leu Ala Leu Thr Lys Met Val Pro Ile Pro Ala Gly Val Phe
50                  55                  60

Thr Met Gly Thr Asp Asp Pro Gln Ile Lys Gln Asp Gly Glu Ala Pro
65                  70                  75                  80

Ala Arg Arg Val Thr Val Asp Ala Phe Tyr Met Asp Ala Tyr Glu Val
            85                  90                  95

Ser Asn Ala Asp Phe Glu Lys Phe Val Asn Ser Thr Gly Tyr Leu Thr
            100                 105                 110

Glu Ala Glu Lys Phe Gly Asp Ser Phe Val Phe Glu Gly Met Leu Ser
            115                 120                 125

Glu Pro Val Lys Ala Gln Ile His Gln Ala Val Ala Ala Ala Pro Trp
130                 135                 140

Trp Leu Pro Val Lys Gly Ala Asp Trp Arg His Pro Glu Gly Pro Asp
145                 150                 155                 160

Ser Thr Ile Leu His Arg Ser Asn His Pro Val Leu His Val Ser Trp
            165                 170                 175

Asn Asp Ala Val Ala Tyr Cys Ala Trp Ala Gly Lys Arg Leu Pro Thr
            180                 185                 190

```
Glu Ala Glu Trp Glu Tyr Ser Cys Arg Gly Gly Leu Gln Asn Arg Leu
    195                 200                 205

Phe Pro Trp Gly Asn Lys Leu Gln Pro Lys Gly Gln His Tyr Ala Asn
    210                 215                 220

Ile Trp Gln Gly Glu Phe Pro Val Thr Asn Thr Gly Glu Asp Gly Phe
225             230                 235                     240

Gln Gly Thr Ala Pro Val Asp Ala Phe Pro Pro Asn Gly Tyr Gly Leu
                245                 250                 255

Tyr Asn Ile Val Gly Asn Ala Trp Glu Trp Thr Ser Asp Trp Trp Thr
                260             265                 270

Val His His Ser Ala Glu Glu Thr Leu Asn Pro Lys Gly Pro Thr Ser
        275                 280                 285

Gly Lys Asp Arg Val Lys Lys Gly Gly Ser Tyr Met Cys His Lys Ser
        290                 295             300

Tyr Cys Tyr Arg Tyr Arg Cys Ala Ala Arg Ser Gln Asn Thr Pro Asp
305             310                 315                 320

Ser Ser Ala Ser Asn Leu Gly Phe Arg Cys Ala Ala Asp His Leu Pro
                325                 330                 335

Thr Ala Asn
```

OPTIMIZED SUMF1 GENES AND EXPRESSION CASSETTES AND THEIR USE

STATEMENT OF PRIORITY

This patent application is a 35 U.S.C. § 371 national phase application of PCT Application PCT/US2020/030236 filed Apr. 28, 2020, which claims the benefit, under 35 U.S.C. § 119 (e), of U.S. Provisional Application No. 62/840,114, filed on Apr. 29, 2019, the entire contents of each of which are incorporated by reference herein.

STATEMENT REGARDING ELECTRONIC FILING OF A SEQUENCE LISTING

A Sequence Listing in ASCII text format, submitted under 37 C.F.R. § 1.821, entitled 5470-863_ST25.txt, 22.487 bytes in size, generated on Oct. 19, 2021 and filed via EFS-Web, is provided in lieu of a paper copy. This Sequence Listing is hereby incorporated herein by reference into the specification for its disclosures.

FIELD OF THE INVENTION

This invention relates to polynucleotides comprising optimized SUMF1 open reading frame (ORF) sequences, vectors comprising the same, and methods of using the same for delivery of the ORF to a cell or a subject and to treat disorders associated with aberrant expression of a SUMF1 gene or aberrant activity of a SUMF1 gene product in the subject, such as multiple sulfatase deficiency.

BACKGROUND OF THE INVENTION

The 9-exon sulfatase modifying factor-1 (SUMF1) gene encodes formylglycine-generating enzyme (FGE), which is required for post-translational modification and activation of sulfatase enzymes (Dierks et al. 2005 *Cell* 121(4):541-552). As such pathogenic mutations in the SUMF1 gene impact the function of all 17 human sulfatase enzymes (Sardiello et al. 2005 *Hum. Mol. Genet.* 14(21):3203-3217; Cosma et al. 2003 *Cell* 113:445-456). FGE modifies a common active site cysteine residue into C-alpha-formylglycine. Without this post-translational modification, sulfatase activity is absent, leading to multiple sulfatase deficiency (MSD). The correlation between different specific SUMF1 mutations, alteration in enzyme activity, and clinical presentation has not been fully elucidated (Ahrens-Nicklas et al. 2018 *Mol. Genet. Metab.* 123(3):337-346). Some of the variety of mutations reported in the literature and the associated disease phenotype are listed in Table 1. However, the genotype-phenotype association is not well understood.

TABLE 1

Published SUMF1 mutations and phenotypes

| Genetic change | Mutant protein | Exon impact | Disease phenotype | Reference |
| --- | --- | --- | --- | --- |
| 661delG | fs, trun; | 5 | Neonatal, severe | Cosma et al. 2003 *Cell* 113:445-456; Dierks et al. 2003 *Cell* 113(4):435-444 |
| 777C>G | N259K | | Neonatal, severe | Nur et al. 2014 *Turk. J. Pediatr.* 56(4);418-422 |
| 725+1G>C; 776A>G; 1018T>C | P202_R242del; N259S; Y340H | 5, 6, 9 | Neonatal, severe | Sabourdy et al. 2015 *Orphanet J. Rare Dis.* 10:31 |
| 979C>T | R327X | | Neonatal, severe | Schlotawa et al. 2011 *Eur. J. Hum. Genet.* 19(3):253-261 |
| IVS3+5-8del; 979C>T | A149_A173del; S327X | 3, x | Neonatal, very severe | Dierks et al. 2003 *Cell* 113(4):435-444 |
| 536G>C | W179S | 4 | Late infantile, mild | Schlotawa et al. 2008 *Hum. Mutat.* 29(1):205 |
| 529G>C; 748delC | A177P; L250fs | 4, 6 | Late infantile, mild | Schlotawa et al. 2008 *Hum. Mutat.* 29(1):205 |
| 788G>T | G263V | | Late infantile, mild | Schlotawa et al. 2011 *Eur. J. Hum. Genet.* 19(3):253-261 |
| 836C>T | A279V | 6 | Late infantile, mild | Schlotawa et al. 2008 *Hum. Mutat.* 29(1):205; Sabourdy et al. 2015 *Orphanet J. Rare Dis.* 10:31 |
| 519+4A>G; 893C>A | A149_A173del, A175del; A298E | 3, 7 | Late infantile, mild | Sabourdy et al. 2015 *Orphanet J. Rare Dis.* 10:31 |
| 520_954dup | V174_P318dup | 4 to 7 | Late infantile, mild | Gray et al. 2011 *Mol. Ther.* 19(6):1058-1069 |
| 337G>A; 519+5_519+8del | E113K; A149_A173del | 2, 3 | Late infantile, severe | Jaszczuk et al. 2017 *Mol. Genet. Metab.* 121(3):252-258 |
| 463C>T | S155P | | Late infantile, severe | Schlotawa et al. 2011 *Eur. J. Hum. Genet.* 19(3):253-261 |
| 739G>C | G247R | | Late infantile, severe | |
| 1033C>T | R345C | | Late infantile, severe | Schlotawa et al. 2011 *Eur. J. Hum. Genet.* 19(3):253-261 |
| 1045C>T | R349W | 9 | Late infantile, severe | Federici et al. 2011 *Gene Ther.* 19(8):852-859; Settembre et al. 2007 *PNAS* 104(11);4506-4511 |
| 132_133insG; 1045C>T | V45fsX75; R349W | 1, 9 | Late infantile, severe | Gray et al. 2011 *Mol. Ther.* 19(6); 1058-1069 |
| 706C>T; 1045C>T | R236X; R349W | 5, 9 | Late infantile, severe | Gray et al. 2011 *Mol. Ther.* 19(6); 1058-1069 |
| 463T>C; | S155P; | 3, 9 | Juvenile | Gray et al. 2011 *Mol. Ther.* 19(6); |

TABLE 1-continued

Published SUMF1 mutations and phenotypes

| Genetic change | Mutant protein | Exon impact | Disease phenotype | Reference |
|---|---|---|---|---|
| 1029G>T | R343S | | | 1058-1069 |
| IVS3+5-8del; 1076C>A | A149_A173del; S359X | 3, 9 | unspecified | Cosma et al. 2003 *Cell* 113:445-456; Settembre et al. 2007 *PNAS* 104(11); 4506-4511 |
| 1006T>C; 1046G>A | C336R; R349Q | 9 | Severe | Settembre et al. 2007 *PNAS* 104(11); 4506-4511 |
| 243delC; 836 C>T | fs, trun; A279V | 6 | unspecified | Settembre et al. 2007 *PNAS* 104(11); 4506-4511 | fs—frame shift;
dup—duplication;
del—deletion

Individuals affected by MSD exhibit a constellation of neurologic and somatic features that overlap with known inherited single sulfatase disorders (i.e., metachromatic leukodystrophy (MLD) and five mucopolysaccharidoses (MPS) subtypes, X-linked ichthyosis and X-linked chondrodysplasia punctata). In addition all other sulfatases without known clinical correlation also contribute to the complex and variable phenotype found in individuals with MSD (Ahrens-Nicklas et al. 2018).

There are four clinical subtypes of MSD based on the predominant symptoms and ages of onset (Eto et al. 1987 *Enzyme* 38(1-4):273-279; Jaszczuk et al. 2017 *Mol. Genet. Metab.* 121(3):252-258; Garavelli et al. 2014 Ital. *J. Pediatr.* 41:86; Schlotawa et al. 2011 *Eur. J. Hum. Genet.* 19(3):253-261). The neonatal subtype is characterized by severe mucopolysaccharidoses-like symptoms occurring in the first months of life and usually leads to early death before 1 year of age. The late infantile forms include a severe and mild form that onset before or after 2 years of age, respectively. The late infantile forms are characterized by progressive neurodegeneration, such as that observed in metachromatic leukodystrophy; however, individuals may also demonstrate MPS-like somatic symptoms. The juvenile subtype is characterized by a later onset and attenuated symptoms. Although this is the "mildest" form of MSD, individuals with juvenile MSD are affected by severe neurologic impairment by early childhood and premature death. While the existence of an adult-onset form of the disease has been postulated, no genetically confirmed adult-onset individuals have been reported in the literature. All clinical subtypes of MSD present in early childhood and experience severe, progressive central nervous system (CNS) dysfunction. Additionally, most individuals also are affected by extensive somatic involvement, and unfortunately, all affected individuals die by early adulthood mostly due to secondary problems as a result of MSD symptoms.

There are currently no specific treatments available for this disorder. Individuals affected by MSD are managed by supportive care, consultation with medical professionals from multiple disciplines, physical therapy, and pharmacological interventions to alleviate symptoms. There is a need to provide a meaningful and long-term therapeutic benefit for this population in the near future.

SUMMARY OF THE INVENTION

The present invention is based, in part, on the development of optimized SUMF1 genes, expression cassettes, and vectors capable of providing therapeutic levels of SUMF1 expression for treating disorders associated with SUMF1 expression such as SUMF1 disease.

Thus, one aspect of the invention relates to a polynucleotide comprising a human SUMF1 open reading frame, wherein the human SUMF1 open reading frame has been codon-optimized for expression in human cells.

A further aspect of the invention relates to an expression cassette comprising a polynucleotide comprising a human SUMF1 open reading frame and vectors, transformed cells, and transgenic animals comprising the polynucleotide of the invention.

Another aspect of the invention relates to a pharmaceutical formulation comprising the polynucleotide, expression cassette, vector, and/or transformed cell of the invention in a pharmaceutically acceptable carrier.

An additional aspect of the invention relates to a method of expressing a SUMF1 open reading frame in a cell, comprising contacting the cell with the polynucleotide, expression cassette, and/or vector of the invention, thereby expressing the SUMF1 open reading frame in the cell.

A further aspect of the invention relates to a method of expressing a SUMF1 open reading frame in a subject, comprising delivering to the subject the polynucleotide, expression cassette, vector, and/or transformed cell of the invention, thereby expressing the SUMF1 open reading frame in the subject.

An additional aspect of the invention relates to a method of treating a disorder associated with aberrant expression of a SUMF1 gene or aberrant activity of a SUMF1 gene product in a subject in need thereof, comprising administering to the subject a therapeutically effective amount of the polynucleotide, expression cassette, vector, and/or transformed cell of the invention, such that the SUMF1 open reading frame is expressed in the subject.

A further aspect of the invention relates to a method of treating multiple sulfatase deficiency (MSD) in a subject in need thereof, comprising administering to the subject a therapeutically effective amount of the polynucleotide, expression cassette, vector, and/or transformed cell of the invention, such that the SUMF1 open reading frame is expressed in the subject.

Another aspect of the invention relates to a polynucleotide, expression cassette, vector, and/or transformed cell of the invention for use in a method of treating a disorder associated with aberrant expression of a SUMF1 gene or aberrant activity of a SUMF1 gene product in a subject in need thereof.

These and other aspects of the invention are set forth in more detail in the description of the invention below.

BRIEF DESCRIPTION OF THE DRAWINGS

FIG. 1 shows similarities in protein sequence between different species. Human (homo) SUMF1 protein sequence (SEQ ID NO:11) compared to the mouse (mus; 90.27%; SEQ ID NO:13), rat (rattus; 90.56%; SEQ ID NO:14) and monkey (macaca; 96.77%; SEQ ID NO:12) retain high level of amino acid identity. The N-terminal signal peptide from the sequence was removed prior to the comparison. The asterisk (*) annotates a fully conserved amino acid residue, colon (:) annotates strongly similar residues and period (.) annotates weakly similar residues. Amino acids that are not conserved are not annotated.

FIG. 2A shows survival curve for mice in each cohort. FIG. 2B shows mean body weight of each cohort. Body weight of mice that were alive at the time of data collection have been included. Legend: Listed in the top corner of the figure applies to both panels.

FIG. 3A shows survival curve for mice in each cohort. FIG. 3B shows mean body weight of each cohort. Body weight of mice that were alive at the time of data collection have been included.

DETAILED DESCRIPTION OF THE INVENTION

Figure 2A:
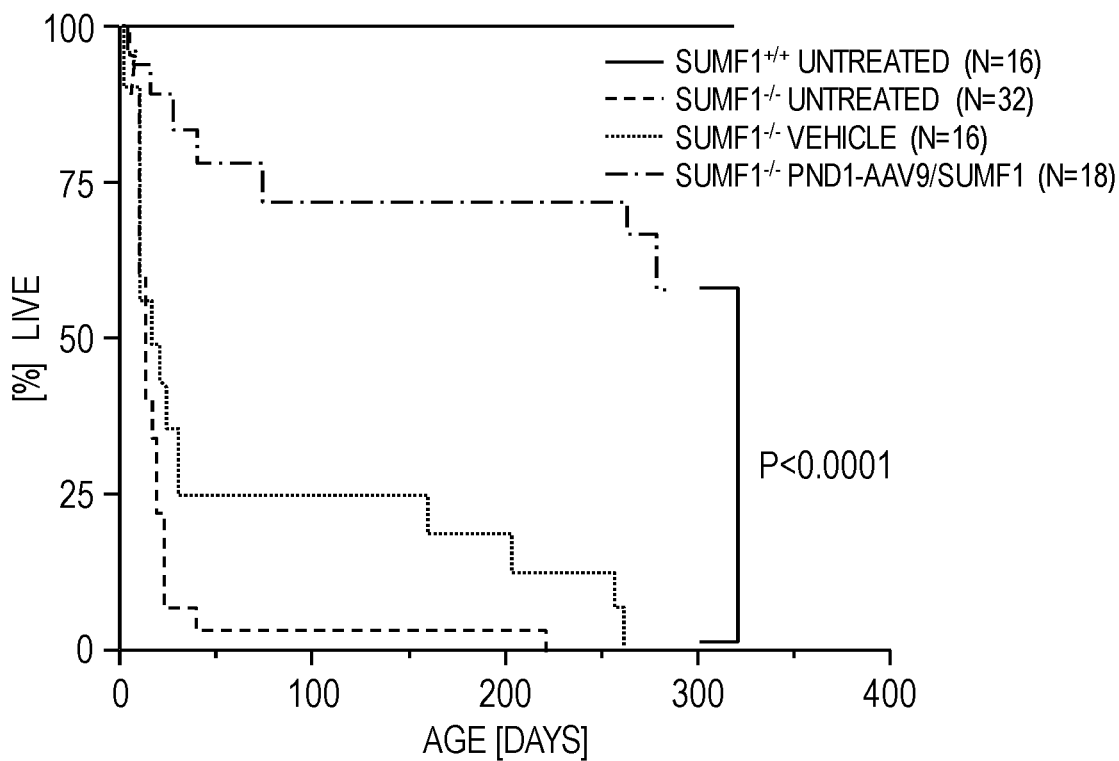
FIGS. 2A-2B show AAV9/SUMF1 therapy in Sumf1−/− neonates improves survival. Sumf1−/− mice received a single dose of AAV9/SUMF1 via ICV on PND1. Control cohorts did not receive any dosing or received a single dose of vehicle.

The present invention is explained in greater detail below. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure which do not depart from the instant invention. Hence, the following specification is intended to illustrate some particular embodiments of the invention, and not to exhaustively specify all permutations, combinations and variations thereof.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Nucleotide sequences are presented herein by single strand only, in the 5' to 3' direction, from left to right, unless specifically indicated otherwise. Nucleotides and amino acids are represented herein in the manner recommended by the IUPAC-IUB Biochemical Nomenclature Commission, or (for amino acids) by either the one-letter code, or the three letter code, both in accordance with 37 C.F.R. § 1.822 and established usage.

Except as otherwise indicated, standard methods known to those skilled in the art may be used for production of recombinant and synthetic polypeptides, antibodies or antigen-binding fragments thereof, manipulation of nucleic acid sequences, production of transformed cells, the construction of rAAV constructs, modified capsid proteins, packaging vectors expressing the AAV rep and/or cap sequences, and transiently and stably transfected packaging cells. Such techniques are known to those skilled in the art. See, e.g., SAMBROOK et al., MOLECULAR CLONING: A LABORATORY MANUAL 4th Ed. (Cold Spring Harbor, NY, 2012); F. M. AUSUBEL et al. CURRENT PROTOCOLS IN MOLECULAR BIOLOGY (Green Publishing Associates, Inc. and John Wiley & Sons, Inc., New York).

All publications, patent applications, patents, nucleotide sequences, amino acid sequences and other references mentioned herein are incorporated by reference in their entirety.

Definitions

As used in the description of the invention and the appended claims, the singular forms "a," "an" and "the" are intended to include the plural forms as well, unless the context clearly indicates otherwise.

As used herein, "and/or" refers to and encompasses any and all possible combinations of one or more of the associated listed items, as well as the lack of combinations when interpreted in the alternative ("or").

Moreover, the present invention also contemplates that in some embodiments of the invention, any feature or combination of features set forth herein can be excluded or omitted.

Furthermore, the term "about," as used herein when referring to a measurable value such as an amount of a compound or agent of this invention, dose, time, temperature, and the like, is meant to encompass variations of ±10%, ±5%, ±1%, ±0.5%, or even ±0.1% of the specified amount.

As used herein, the transitional phrase "consisting essentially of" is to be interpreted as encompassing the recited materials or steps and those that do not materially affect the basic and novel characteristic(s) of the claimed invention. Thus, the term "consisting essentially of" as used herein should not be interpreted as equivalent to "comprising."

The term "consists essentially of" (and grammatical variants), as applied to a polynucleotide or polypeptide sequence of this invention, means a polynucleotide or polypeptide that consists of both the recited sequence (e.g., SEQ ID NO) and a total of ten or less (e.g., 1, 2, 3, 4, 5, 6, 7, 8, 9, or 10) additional nucleotides or amino acids on the 5' and/or 3' or N-terminal and/or C-terminal ends of the recited sequence or between the two ends (e.g., between domains) such that the function of the polynucleotide or polypeptide is not materially altered. The total of ten or less additional nucleotides or amino acids includes the total number of additional nucleotides or amino acids added together. The term "materially altered," as applied to polynucleotides of the invention, refers to an increase or decrease in ability to express the encoded polypeptide of at least about 50% or more as compared to the expression level of a polynucleotide consisting of the recited sequence. The term "materially altered," as applied to polypeptides of the invention, refers to an increase or decrease in biological activity of at least about 50% or more as compared to the activity of a polypeptide consisting of the recited sequence.

The term "parvovirus" as used herein encompasses the family Parvoviridae, including autonomously-replicating parvoviruses and dependoviruses. The autonomous parvoviruses include members of the genera Parvovirus, Erythrovirus, Densovirus, Iteravirus, and Contravirus. Exemplary autonomous parvoviruses include, but are not limited to, minute virus of mouse, bovine parvovirus, canine parvovirus, chicken parvovirus, feline panleukopenia virus, feline parvovirus, goose parvovirus, H1 parvovirus, muscovy duck parvovirus, snake parvovirus, and B19 virus. Other autonomous parvoviruses are known to those skilled in the art. See, e.g., FIELDS et al., VIROLOGY, volume 2, chapter 69 (4th ed., Lippincott-Raven Publishers).

The genus Dependovirus contains the adeno-associated viruses (AAV), including but not limited to, AAV type 1, AAV type 2, AAV type 3 (including types 3A and 3B), AAV type 4, AAV type 5, AAV type 6, AAV type 7, AAV type 8, AAV type 9, AAV type 10, AAV type 11, AAV type 12, AAV type 13, avian AAV, bovine AAV, canine AAV, goat AAV, snake AAV, equine AAV, and ovine AAV. See, e.g., FIELDS et al., VIROLOGY, volume 2, chapter 69 (4th ed., Lippincott-Raven Publishers); and Table 1.

The term "adeno-associated virus" (AAV) in the context of the present invention includes without limitation AAV type 1, AAV type 2, AAV type 3 (including types 3A and 3B), AAV type 4, AAV type 5, AAV type 6, AAV type 7, AAV type 8, AAV type 9, AAV type 10, AAV type 11, avian AAV, bovine AAV, canine AAV, equine AAV, and ovine AAV and any other AAV now known or later discovered. See, e.g., BERNARD N. FIELDS et al., VIROLOGY, volume 2, chapter 69 (4th ed., Lippincott-Raven Publishers). A number of additional AAV serotypes and clades have been identified (see, e.g., Gao et al., (2004) *J. Virol.* 78:6381-6388 and Table 2), which are also encompassed by the term "AAV."

The parvovirus particles and genomes of the present invention can be from, but are not limited to, AAV. The genomic sequences of various serotypes of AAV and the autonomous parvoviruses, as well as the sequences of the native ITRs, Rep proteins, and capsid subunits are known in the art. Such sequences may be found in the literature or in public databases such as GenBank. See, e.g., GenBank Accession Numbers NC_002077, NC_001401, NC_001729, NC_001863, NC_001829, NC_001862, NC_000883, NC_001701, NC_001510, NC_006152, NC_006261, AF063497, U89790, AF043303, AF028705, AF028704, J02275, J01901, J02275, X01457, AF288061, AH009962, AY028226, AY028223, AY631966, AX753250, EU285562, NC_001358, NC_001540, AF513851, AF513852 and AY530579; the disclosures of which are incorporated by reference herein for teaching parvovirus and AAV nucleic acid and amino acid sequences. See also, e.g., Bantel-Schaal et al., (1999) *J. Virol.* 73: 939; Chiorini et al., (1997) *J. Virol.* 71:6823; Chiorini et al., (1999) *J. Virol.* 73:1309; Gao et al., (2002) *Proc. Nat. Acad. Sci. USA* 99:11854; Moris et al., (2004) *J. Virol.* 33-:375-383; Mori et al., (2004) *J. Virol.* 330:375; Muramatsu et al., (1996) *J. Virol.* 221:208; Ruffing et al., (1994) *J. Gen. Virol.* 75:3385; Rutledge et al., (1998) *J. Virol.* 72:309; Schmidt et al., (2008) *J. Virol.* 82:8911; Shade et al., (1986) *J. Virol.* 58:921; Srivastava et al., (1983) *J. Virol.* 45:555; Xiao et al., (1999) *J. Virol.* 73:3994; international patent publications WO 00/28061, WO 99/61601, WO 98/11244; and U.S. Pat. No. 6,156,303; the disclosures of which are incorporated by reference herein for teaching parvovirus and AAV nucleic acid and amino acid sequences. See also Table 2. An early description of the AAV1, AAV2 and AAV3 ITR sequences is provided by Xiao, X., (1996), "Characterization of Adeno-associated virus (AAV) DNA replication and integration," Ph.D. Dissertation, University of Pittsburgh, Pittsburgh, PA (incorporated herein it its entirety).

A "chimeric" AAV nucleic acid capsid coding sequence or AAV capsid protein is one that combines portions of two or more capsid sequences. A "chimeric" AAV virion or particle comprises a chimeric AAV capsid protein.

The term "tropism" as used herein refers to preferential entry of the virus into certain cell or tissue type(s) and/or preferential interaction with the cell surface that facilitates entry into certain cell or tissue types, optionally and preferably followed by expression (e.g., transcription and, optionally, translation) of sequences carried by the viral genome in the cell, e.g., for a recombinant virus, expression of the heterologous nucleotide sequence(s). Those skilled in the art will appreciate that transcription of a heterologous nucleic acid sequence from the viral genome may not be initiated in the absence of trans-acting factors, e.g., for an inducible promoter or otherwise regulated nucleic acid sequence. In the case of a rAAV genome, gene expression from the viral genome may be from a stably integrated provirus and/or from a non-integrated episome, as well as any other form which the virus nucleic acid may take within the cell.

The term "tropism profile" refers to the pattern of transduction of one or more target cells, tissues and/or organs. Representative examples of chimeric AAV capsids have a tropism profile characterized by efficient transduction of cells of the central nervous system (CNS) with only low transduction of peripheral organs (see e.g., U.S. Pat. No. 9,636,370 McCown et al., and US patent publication 2017/0360960 Gray et al.).

The term "disorder associated with aberrant expression of a SUMF1 gene" as used herein refers to a disease, disorder, syndrome, or condition that is caused by or a symptom of decreased or altered expression of the SUMF1 gene in a subject relative to the expression level in a normal subject or in a population.

The term "disorder associated with aberrant activity of a SUMF1 gene product" as used herein refers to a disease, disorder, syndrome, or condition that is caused by or a symptom of decreased or altered activity of the SUMF1 gene product in a subject relative to the activity in a normal subject or in a population. In some embodiments, a disorder associated with aberrant activity of a SUMF1 gene product may be multiple sulfatase deficiency (e.g., neonatal, severe late infantile, mild late infantile, juvenile, and/or adult-onset MSD).

TABLE 2

| AAV Serotypes/Isolates | GenBank Accession Number |
|---|---|
| Clonal Isolates | |
| Avian AAV ATCC VR-865 | AY186198, AY629583, NC_004828 |
| Avian AAV strain DA-1 | NC_006263, AY629583 |
| Bovine AAV | NC_005889, AY388617 |

TABLE 2-continued

| AAV Serotypes/Isolates | GenBank Accession Number |
|---|---|
| AAV4 | NC_001829 |
| AAV5 | AY18065, AF085716 |
| Rh34 | AY243001 |
| Rh33 | AY243002 |
| Rh32 | AY243003 |
| AAV10 | AY631965 |
| AAV11 | AY631966 |
| AAV12 | DQ813647 |
| AAV13 | EU285562 |
| Clade A | |
| AAV1 | NC_002077, AF063497 |
| AAV6 | NC_001862 |
| Hu.48 | AY530611 |
| Hu 43 | AY530606 |
| Hu 44 | AY530607 |
| Hu 46 | AY530609 |
| Clade B | |
| Hu19 | AY530584 |
| Hu20 | AY530586 |
| Hu23 | AY530589 |
| Hu22 | AY530588 |
| Hu24 | AY530590 |
| Hu21 | AY530587 |
| Hu27 | AY530592 |
| Hu28 | AY530593 |
| Hu29 | AY530594 |
| Hu63 | AY530624 |
| Hu64 | AY530625 |
| Hu13 | AY530578 |
| Hu56 | AY530618 |
| Hu57 | AY530619 |
| Hu49 | AY530612 |
| Hu58 | AY530620 |
| Hu34 | AY530598 |
| Hu35 | AY530599 |
| AAV2 | NC_001401 |
| Hu45 | AY530608 |
| Hu47 | AY530610 |
| Hu51 | AY530613 |
| Hu52 | AY530614 |
| Hu T41 | AY695378 |
| Hu S17 | AY695376 |
| Hu T88 | AY695375 |
| Hu T71 | AY695374 |
| Hu T70 | AY695373 |
| Hu T40 | AY695372 |
| Hu T32 | AY695371 |
| Hu T17 | AY695370 |
| Hu LG15 | AY695377 |
| Clade C | |
| AAV 3 | NC_001729 |
| AAV 3B | NC_001863 |
| Hu9 | AY530629 |
| Hu10 | AY530576 |
| Hu11 | AY530577 |
| Hu53 | AY530615 |
| Hu55 | AY530617 |
| Hu54 | AY530616 |
| Hu7 | AY530628 |
| Hu18 | AY530583 |
| Hu15 | AY530580 |
| Hu16 | AY530581 |
| Hu25 | AY530591 |
| Hu60 | AY530622 |
| Ch5 | AY243021 |
| Hu3 | AY530595 |
| Hu1 | AY530575 |
| Hu4 | AY530602 |
| Hu2 | AY530585 |
| Hu61 | AY530623 |

TABLE 2-continued

| AAV Serotypes/Isolates | GenBank Accession Number |
|---|---|
| Clade D | |
| Rh62 | AY530573 |
| Rh48 | AY530561 |
| Rh54 | AY530567 |
| Rh55 | AY530568 |
| Cy2 | AY243020 |
| AAV7 | AF513851 |
| Rh35 | AY243000 |
| Rh37 | AY242998 |
| Rh36 | AY242999 |
| Cy6 | AY243016 |
| Cy4 | AY243018 |
| Cy3 | AY243019 |
| Cy5 | AY243017 |
| Rh13 | AY243013 |
| Clade E | |
| Rh38 | AY530558 |
| Hu66 | AY530626 |
| Hu42 | AY530605 |
| Hu67 | AY530627 |
| Hu40 | AY530603 |
| Hu41 | AY530604 |
| Hu37 | AY530600 |
| Rh40 | AY530559 |
| Rh2 | AY243007 |
| Bb1 | AY243023 |
| Bb2 | AY243022 |
| Rh10 | AY243015 |
| Hu17 | AY530582 |
| Hu6 | AY530621 |
| Rh25 | AY530557 |
| Pi2 | AY530554 |
| Pi1 | AY530553 |
| Pi3 | AY530555 |
| Rh57 | AY530569 |
| Rh50 | AY530563 |
| Rh49 | AY530562 |
| Hu39 | AY530601 |
| Rh58 | AY530570 |
| Rh61 | AY530572 |
| Rh52 | AY530565 |
| Rh53 | AY530566 |
| Rh51 | AY530564 |
| Rh64 | AY530574 |
| Rh43 | AY530560 |
| AAV8 | AF513852 |
| Rh8 | AY242997 |
| Rh1 | AY530556 |
| Clade F | |
| AAV9 (Hu14) | AY530579 |
| Hu31 | AY530596 |
| Hu32 | AY530597 |

Sulfatases are a conserved family of enzymes catalyzing hydrolysis of ester sulfates (Preusser-Kunze et al. 2005 *J. Biol. Chem.* 280(15):14900-14910; Landgrebe et al. 2003 *Gene.* 316:47-56). In humans there are 17 sulfatases localized to various subcellular regions where they metabolize specific substrates (Sardiello et al. 2005) such as glycosaminoglycans (GAGs), sulfolipids and steroid sulfates (Hopwood & Ballabio 1997 *The Metabolic and Molecular Basis of the Inherited Disease* McGraw-Hill, pp 3725-3732) among others. Post-translational activation of these sulfatase enzymes is dependent upon modification of a conserved catalytic domain cysteine within a conserved amino acid sequence recognized by FGE in every sulfatase (Schmidt et al. 1995 *Cell.* 82(2); 271-278). SUMF1-encoded FGE is the only enzyme capable of performing this modification in mammals (Dierks et al. 2009 *Biochim. Biophys. Acta.* 1793 (4):710-725). When SUMF1 is mutated, impacting FGE function, the activity of sulfatases is severely impaired.

Residual sulfatase activity depends on stability and activity of mutant FGE. Impaired or absent sulfatase activities result in lysosomal storage of substrates resulting in cell pathology as a lysosomal storage disorder and additional dysfunction of non-lysosomal sulfatases.

SUMF1 has been conserved through evolution retaining high level of homology across species. The enzyme's stability and activity highly depend on disulfide bridges within the protein and cysteine residues in the active site. These residues are identical throughout species and allow similar fold and function of any SUMF1 homologue (Dierks et al. 2009; Landgrebe et al. 2003; Carlson et al. 2008 *J. Biol. Chem.* 283(29):20117-20125). SUMF2, a highly similar paralogue of SUMF1 gene, lacks catalytic activity and is not able to activate sulfatases (Carlson et al. 2008). Overexpression of SUMF1 in cell and animal models and in combination with sulfatases does not result in any pathophysiology (Spampanato et al. 2011 *Mol. Ther.* 19(5):860-869).

As used herein, "transduction" of a cell by a virus vector (e.g., an AAV vector) means entry of the vector into the cell and transfer of genetic material into the cell by the incorporation of nucleic acid into the virus vector and subsequent transfer into the cell via the virus vector.

Unless indicated otherwise, "efficient transduction" or "efficient tropism," or similar terms, can be determined by reference to a suitable positive or negative control (e.g., at least about 50%, 60%, 70%, 80%, 85%, 90%, 95% or more of the transduction or tropism, respectively, of a positive control or at least about 110%, 120%, 150%, 200%, 300%, 500%, 1000% or more of the transduction or tropism, respectively, of a negative control).

Similarly, it can be determined if a virus "does not efficiently transduce" or "does not have efficient tropism" for a target tissue, or similar terms, by reference to a suitable control. In particular embodiments, the virus vector does not efficiently transduce (i.e., does not have efficient tropism for) tissues outside the CNS, e.g., liver, kidney, gonads and/or germ cells. In particular embodiments, undesirable transduction of tissue(s) (e.g., liver) is 20% or less, 10% or less, 5% or less, 1% or less, 0.1% or less of the level of transduction of the desired target tissue(s) (e.g., CNS cells).

The terms "5' portion" and "3' portion" are relative terms to define a spatial relationship between two or more elements. Thus, for example, a "3' portion" of a polynucleotide indicates a segment of the polynucleotide that is downstream of another segment. The term "3' portion" is not intended to indicate that the segment is necessarily at the 3' end of the polynucleotide, or even that it is necessarily in the 3' half of the polynucleotide, although it may be. Likewise, a "5' portion" of a polynucleotide indicates a segment of the polynucleotide that is upstream of another segment. The term "5' portion" is not intended to indicate that the segment is necessarily at the 5' end of the polynucleotide, or even that it is necessarily in the 5' half of the polynucleotide, although it may be.

As used herein, the term "polypeptide" encompasses both peptides and proteins, unless indicated otherwise.

A "polynucleotide," "nucleic acid," or "nucleotide sequence" may be of RNA, DNA or DNA-RNA hybrid sequences (including both naturally occurring and non-naturally occurring nucleotides), but is preferably either a single or double stranded DNA sequence.

The term "regulatory element" refers to a genetic element which controls some aspect of the expression of nucleic acid sequences. For example, a promoter is a regulatory element which facilitates the initiation of transcription of an operably linked coding region. Other regulatory elements are splicing signals, polyadenylation signals, termination signals, etc. The region in a nucleic acid sequence or polynucleotide in which one or more regulatory elements are found may be referred to as a "regulatory region."

As used herein with respect to nucleic acids, the term "operably linked" refers to a functional linkage between two or more nucleic acids. For example, a promoter sequence may be described as being "operably linked" to a heterologous nucleic acid sequence because the promoter sequences initiates and/or mediates transcription of the heterologous nucleic acid sequence. In some embodiments, the operably linked nucleic acid sequences are contiguous and/or are in the same reading frame.

The term "open reading frame (ORF)," as used herein, refers to the portion of a polynucleotide, e.g., a gene, that encodes a polypeptide. The term "coding region" may be used interchangeably with open reading frame.

The term "codon-optimized," as used herein, refers to a gene coding sequence that has been optimized to increase expression by substituting one or more codons normally present in a coding sequence (for example, in a wild-type sequence, including, e.g., a coding sequence for SUMF1) with a codon for the same (synonymous) amino acid. In this manner, the protein encoded by the gene is identical, but the underlying nucleobase sequence of the gene or corresponding mRNA is different. In some embodiments, the optimization substitutes one or more rare codons (that is, codons for tRNA that occur relatively infrequently in cells from a particular species) with synonymous codons that occur more frequently to improve the efficiency of translation. For example, in human codon-optimization one or more codons in a coding sequence are replaced by codons that occur more frequently in human cells for the same amino acid. Codon optimization can also increase gene expression through other mechanisms that can improve efficiency of transcription and/or translation. Strategies include, without limitation, increasing total GC content (that is, the percent of guanines and cytosines in the entire coding sequence), decreasing CpG content (that is, the number of CG or GC dinucleotides in the coding sequence), removing cryptic splice donor or acceptor sites, and/or adding or removing ribosomal entry sites, such as Kozak sequences. Desirably, a codon-optimized gene exhibits improved protein expression, for example, the protein encoded thereby is expressed at a detectably greater level in a cell compared with the level of expression of the protein provided by the wild-type gene in an otherwise similar cell.

The term "sequence identity," as used herein, has the standard meaning in the art. As is known in the art, a number of different programs can be used to identify whether a polynucleotide or polypeptide has sequence identity or similarity to a known sequence. Sequence identity or similarity may be determined using standard techniques known in the art, including, but not limited to, the local sequence identity algorithm of Smith & Waterman, *Adv. Appl. Math.* 2:482 (1981), by the sequence identity alignment algorithm of Needleman & Wunsch, *J. Mol. Biol.* 48:443 (1970), by the search for similarity method of Pearson & Lipman, *Proc. Natl. Acad. Sci. USA* 85:2444 (1988), by computerized implementations of these algorithms (GAP, BESTFIT, FASTA, and TFASTA in the Wisconsin Genetics Software Package, Genetics Computer Group, 575 Science Drive, Madison, WI), the Best Fit sequence program described by Devereux et al., *Nucl. Acid Res.* 12:387 (1984), preferably using the default settings, or by inspection.

An example of a useful algorithm is PILEUP. PILEUP creates a multiple sequence alignment from a group of related sequences using progressive, pairwise alignments. It can also plot a tree showing the clustering relationships used to create the alignment. PILEUP uses a simplification of the progressive alignment method of Feng & Doolittle, *J. Mol. Evol.* 35:351 (1987); the method is similar to that described by Higgins & Sharp, *CABIOS* 5:151 (1989).

Another example of a useful algorithm is the BLAST algorithm, described in Altschul et al., *J. Mol. Biol.* 215:403 (1990) and Karlin et al., *Proc. Natl. Acad. Sci. USA* 90:5873 (1993). A particularly useful BLAST program is the WU-BLAST-2 program which was obtained from Altschul et al., *Meth. Enzymol.*, 266:460 (1996); blast.wustl/edu/blast/RE-ADME.html. WU-BLAST-2 uses several search parameters, which are preferably set to the default values. The parameters are dynamic values and are established by the program itself depending upon the composition of the particular sequence and composition of the particular database against which the sequence of interest is being searched; however, the values may be adjusted to increase sensitivity.

An additional useful algorithm is gapped BLAST as reported by Altschul et al., *Nucleic Acids Res.* 25:3389 (1997).

A percentage amino acid sequence identity value is determined by the number of matching identical residues divided by the total number of residues of the "longer" sequence in the aligned region. The "longer" sequence is the one having the most actual residues in the aligned region (gaps introduced by WU-Blast-2 to maximize the alignment score are ignored).

In a similar manner, percent nucleic acid sequence identity is defined as the percentage of nucleotide residues in the candidate sequence that are identical with the nucleotides in the polynucleotide specifically disclosed herein.

The alignment may include the introduction of gaps in the sequences to be aligned. In addition, for sequences which contain either more or fewer nucleotides than the polynucleotides specifically disclosed herein, it is understood that in one embodiment, the percentage of sequence identity will be determined based on the number of identical nucleotides in relation to the total number of nucleotides. Thus, for example, sequence identity of sequences shorter than a sequence specifically disclosed herein, will be determined using the number of nucleotides in the shorter sequence, in one embodiment. In percent identity calculations relative weight is not assigned to various manifestations of sequence variation, such as insertions, deletions, substitutions, etc.

In one embodiment, only identities are scored positively (+1) and all forms of sequence variation including gaps are assigned a value of "0," which obviates the need for a weighted scale or parameters as described below for sequence similarity calculations. Percent sequence identity can be calculated, for example, by dividing the number of matching identical residues by the total number of residues of the "shorter" sequence in the aligned region and multiplying by 100. The "longer" sequence is the one having the most actual residues in the aligned region.

As used herein, an "isolated" nucleic acid or nucleotide sequence (e.g., an "isolated DNA" or an "isolated RNA") means a nucleic acid or nucleotide sequence separated or substantially free from at least some of the other components of the naturally occurring organism or virus, for example, the cell or viral structural components or other polypeptides or nucleic acids commonly found associated with the nucleic acid or nucleotide sequence.

Likewise, an "isolated" polypeptide means a polypeptide that is separated or substantially free from at least some of the other components of the naturally occurring organism or virus, for example, the cell or viral structural components or other polypeptides or nucleic acids commonly found associated with the polypeptide.

As used herein, the term "modified," as applied to a polynucleotide or polypeptide sequence, refers to a sequence that differs from a wild-type sequence due to one or more deletions, additions, substitutions, or any combination thereof.

As used herein, by "isolate" (or grammatical equivalents) a virus vector, it is meant that the virus vector is at least partially separated from at least some of the other components in the starting material.

By the term "treat," "treating," or "treatment of" (or grammatically equivalent terms) is meant to reduce or to at least partially improve or ameliorate the severity of the subject's condition and/or to alleviate, mitigate or decrease in at least one clinical symptom and/or to delay the progression of the condition.

As used herein, the term "prevent," "prevents," or "prevention" (and grammatical equivalents thereof) means to delay or inhibit the onset of a disease. The terms are not meant to require complete abolition of disease, and encompass any type of prophylactic treatment to reduce the incidence of the condition or delays the onset of the condition.

A "treatment effective" amount as used herein is an amount that is sufficient to provide some improvement or benefit to the subject. Alternatively stated, a "treatment effective" amount is an amount that will provide some alleviation, mitigation, decrease or stabilization in at least one clinical symptom in the subject. Those skilled in the art will appreciate that the therapeutic effects need not be complete or curative, as long as some benefit is provided to the subject.

A "prevention effective" amount as used herein is an amount that is sufficient to prevent and/or delay the onset of a disease, disorder and/or clinical symptoms in a subject and/or to reduce and/or delay the severity of the onset of a disease, disorder and/or clinical symptoms in a subject relative to what would occur in the absence of the methods of the invention. Those skilled in the art will appreciate that the level of prevention need not be complete, as long as some benefit is provided to the subject.

A "heterologous nucleotide sequence" or "heterologous nucleic acid," with respect to a virus, is a sequence or nucleic acid, respectively, that is not naturally occurring in the virus. Generally, the heterologous nucleic acid or nucleotide sequence comprises an open reading frame that encodes a polypeptide and/or a nontranslated RNA.

A "vector" refers to a compound used as a vehicle to carry foreign genetic material into another cell, where it can be replicated and/or expressed. A cloning vector containing foreign nucleic acid is termed a recombinant vector. Examples of nucleic acid vectors are plasmids, viral vectors, cosmids, expression cassettes, and artificial chromosomes. Recombinant vectors typically contain an origin of replication, a multicloning site, and a selectable marker. The nucleic acid sequence typically consists of an insert (recombinant nucleic acid or transgene) and a larger sequence that serves as the "backbone" of the vector. The purpose of a vector which transfers genetic information to another cell is typically to isolate, multiply, or express the insert in the target cell. Expression vectors (expression constructs or expression cassettes) are for the expression of the exogenous gene in the target cell, and generally have a promoter sequence that drives expression of the exogenous gene/ORF. Insertion of a vector into the target cell is referred to transformation or transfection for bacterial and eukaryotic cells, although insertion of a viral vector is often called transduction. The term "vector" may also be used in general to describe items to that serve to carry foreign genetic material into another cell, such as, but not limited to, a transformed cell or a nanoparticle.

As used herein, the term "vector," "virus vector," "delivery vector" (and similar terms) in a specific embodiment generally refers to a virus particle that functions as a nucleic acid delivery vehicle, and which comprises the viral nucleic acid (i.e., the vector genome) packaged within the virion. Virus vectors according to the present invention comprise a chimeric AAV capsid according to the invention and can package an AAV or rAAV genome or any other nucleic acid including viral nucleic acids. Alternatively, in some contexts, the term "vector," "virus vector," "delivery vector" (and similar terms) may be used to refer to the vector genome (e.g., vDNA) in the absence of the virion and/or to a viral capsid that acts as a transporter to deliver molecules tethered to the capsid or packaged within the capsid.

The virus vectors of the invention can further be duplexed parvovirus particles as described in international patent publication WO 01/92551 (the disclosure of which is incorporated herein by reference in its entirety). Thus, in some embodiments, double stranded (duplex) genomes can be packaged.

A "recombinant AAV vector genome" or "rAAV genome" is an AAV genome (i.e., vDNA) that comprises at least one inverted terminal repeat (e.g., one, two or three inverted terminal repeats) and one or more heterologous nucleotide sequences. rAAV vectors generally retain the 145 base terminal repeat(s) (TR(s)) in cis to generate virus; however, modified AAV TRs and non-AAV TRs including partially or completely synthetic sequences can also serve this purpose. All other viral sequences are dispensable and may be supplied in trans (Muzyczka, (1992) Curr. Topics Microbiol. Immunol. 158:97). The rAAV vector optionally comprises two TRs (e.g., AAV TRs), which generally will be at the 5' and 3' ends of the heterologous nucleotide sequence(s), but need not be contiguous thereto. The TRs can be the same or different from each other. The vector genome can also contain a single ITR at its 3' or 5' end.

The term "terminal repeat" or "TR" includes any viral terminal repeat or synthetic sequence that forms a hairpin structure and functions as an inverted terminal repeat (ITR) (i.e., mediates the desired functions such as replication, virus packaging, integration and/or provirus rescue, and the like). The TR can be an AAV TR or a non-AAV TR. For example, a non-AAV TR sequence such as those of other parvoviruses (e.g., canine parvovirus (CPV), mouse parvovirus (MVM), human parvovirus B-19) or the SV40 hairpin that serves as the origin of SV40 replication can be used as a TR, which can further be modified by truncation, substitution, deletion, insertion and/or addition. Further, the TR can be partially or completely synthetic, such as the "double-D sequence" as described in U.S. Pat. No. 5,478,745 to Samulski et al.

Parvovirus genomes have palindromic sequences at both their 5' and 3' ends. The palindromic nature of the sequences leads to the formation of a hairpin structure that is stabilized by the formation of hydrogen bonds between the complementary base pairs. This hairpin structure is believed to adopt a "Y" or a "T" shape. See, e.g., FIELDS et al., VIROLOGY, volume 2, chapters 69 & 70 (4th ed., Lippincott-Raven Publishers).

An "AAV terminal repeat" or "AAV TR" may be from any AAV, including but not limited to serotypes 1, 2, 3, 4, 5, 6, 7, 8, 9, 10 or 11 or any other AAV now known or later discovered (see, e.g., Table 2). An AAV terminal repeat need not have the native terminal repeat sequence (e.g., a native AAV TR sequence may be altered by insertion, deletion, truncation and/or missense mutations), as long as the terminal repeat mediates the desired functions, e.g., replication, virus packaging, integration, and/or provirus rescue, and the like.

The terms "rAAV particle" and "rAAV virion" are used interchangeably here. A "rAAV particle" or "rAAV virion" comprises a rAAV vector genome packaged within an AAV capsid.

The virus vectors of the invention can further be "targeted" virus vectors (e.g., having a directed tropism) and/or a "hybrid" parvovirus (i.e., in which the viral ITRs and viral capsid are from different parvoviruses) as described in international patent publication WO 00/28004 and Chao et al., (2000) Mol. Therapy 2:619.

Further, the viral capsid or genomic elements can contain other modifications, including insertions, deletions and/or substitutions.

As used herein, the term "amino acid" encompasses any naturally occurring amino acids, modified forms thereof, and synthetic amino acids, including non-naturally occurring amino acids.

Naturally occurring, levorotatory (L-) amino acids are shown in Table 3.

TABLE 3

| Amino Acid Residue | Abbreviation | |
|---|---|---|
| | Three-Letter Code | One-Letter Code |
| Alanine | Ala | A |
| Arginine | Arg | R |
| Asparagine | Asn | N |
| Aspartic acid (Aspartate) | Asp | D |
| Cysteine | Cys | C |
| Glutamine | Gln | Q |
| Glutamic acid (Glutamate) | Glu | E |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |
| Tryptophan | Trp | W |
| Tyrosine | Tyr | Y |
| Valine | Val | V |

Alternatively, the amino acid can be a modified amino acid residue (nonlimiting examples are shown in Table 4) or can be an amino acid that is modified by post-translation modification (e.g., acetylation, amidation, formylation, hydroxylation, methylation, phosphorylation or sulfatation).

TABLE 4

| Amino Acid Residue Derivatives | |
|---|---|
| Modified Amino Acid Residue | Abbreviation |
| 2-Aminoadipic acid | Aad |
| 3-Aminoadipic acid | bAad |
| beta-Alanine, beta-Aminoproprionic acid | bAla |
| 2-Aminobutyric acid | Abu |
| 4-Aminobutyric acid, Piperidinic acid | 4Abu |
| 6-Aminocaproic acid | Acp |
| 2-Aminoheptanoic acid | Ahe |
| 2-Aminoisobutyric acid | Aib |

TABLE 4-continued

Amino Acid Residue Derivatives

| Modified Amino Acid Residue | Abbreviation |
|---|---|
| 3-Aminoisobutyric acid | bAib |
| 2-Aminopimelic acid | Apm |
| t-butylalanine | t-BuA |
| Citrulline | Cit |
| Cyclohexylalanine | Cha |
| 2,4-Diaminobutyric acid | Dbu |
| Desmosine | Des |
| 2,2'-Diaminopimelic acid | Dpm |
| 2,3-Diaminoproprionic acid | Dpr |
| N-Ethylglycine | EtGly |
| N-Ethylasparagine | EtAsn |
| Homoarginine | hArg |
| Homocysteine | hCys |
| Homoserine | hSer |
| Hydroxylysine | Hyl |
| Allo-Hydroxylysine | aHyl |
| 3-Hydroxyproline | 3Hyp |
| 4-Hydroxyproline | 4Hyp |
| Isodesmosine | Ide |
| allo-Isoleucine | aIle |
| Methionine sulfoxide | MSO |
| N-Methylglycine, sarcosine | MeGly |
| N-Methylisoleucine | MeIle |
| 6-N-Methyllysine | MeLys |
| N-Methylvaline | MeVal |
| 2-Naphthylalanine | 2-Nal |
| Norvaline | Nva |
| Norleucine | Nle |
| Ornithine | Orn |
| 4-Chlorophenylalanine | Phe(4-Cl) |
| 2-Fluorophenylalanine | Phe(2-F) |
| 3-Fluorophenylalanine | Phe(3-F) |
| 4-Fluorophenylalanine | Phe(4-F) |
| Phenylglycine | Phg |
| Beta-2-thienylalanine | Thi |

Further, the non-naturally occurring amino acid can be an "unnatural" amino acid as described by Wang et al., (2006) Annu. Rev. Biophys. Biomol. Struct. 35:225-49. These unnatural amino acids can advantageously be used to chemically link molecules of interest to the AAV capsid protein.

The term "template" or "substrate" is used herein to refer to a polynucleotide sequence that may be replicated to produce the parvovirus viral DNA. For the purpose of vector production, the template will typically be embedded within a larger nucleotide sequence or construct, including but not limited to a plasmid, naked DNA vector, bacterial artificial chromosome (BAC), yeast artificial chromosome (YAC) or a viral vector (e.g., adenovirus, herpesvirus, Epstein-Barr Virus, AAV, baculoviral, retroviral vectors, and the like). Alternatively, the template may be stably incorporated into the chromosome of a packaging cell.

As used herein, parvovirus or AAV "Rep coding sequences" indicate the nucleic acid sequences that encode the parvoviral or AAV non-structural proteins that mediate viral replication and the production of new virus particles. The parvovirus and AAV replication genes and proteins have been described in, e.g., FIELDS et al., VIROLOGY, volume 2, chapters 69 & 70 (4th ed., Lippincott-Raven Publishers).

The "Rep coding sequences" need not encode all of the parvoviral or AAV Rep proteins. For example, with respect to AAV, the Rep coding sequences do not need to encode all four AAV Rep proteins (Rep78, Rep 68, Rep52 and Rep40), in fact, it is believed that AAV5 only expresses the spliced Rep68 and Rep40 proteins. In representative embodiments, the Rep coding sequences encode at least those replication proteins that are necessary for viral genome replication and packaging into new virions. The Rep coding sequences will generally encode at least one large Rep protein (i.e., Rep78/68) and one small Rep protein (i.e., Rep52/40). In particular embodiments, the Rep coding sequences encode the AAV Rep78 protein and the AAV Rep52 and/or Rep40 proteins. In other embodiments, the Rep coding sequences encode the Rep68 and the Rep52 and/or Rep40 proteins. In a still further embodiment, the Rep coding sequences encode the Rep68 and Rep52 proteins, Rep68 and Rep40 proteins, Rep78 and Rep52 proteins, or Rep78 and Rep40 proteins.

As used herein, the term "large Rep protein" refers to Rep68 and/or Rep78. Large Rep proteins of the claimed invention may be either wild-type or synthetic. A wild-type large Rep protein may be from any parvovirus or AAV, including but not limited to serotypes 1, 2, 3a, 3b, 4, 5, 6, 7, 8, 9, 10, 11, or 13, or any other AAV now known or later discovered (see, e.g., Table 2). A synthetic large Rep protein may be altered by insertion, deletion, truncation and/or missense mutations.

Those skilled in the art will further appreciate that it is not necessary that the replication proteins be encoded by the same polynucleotide. For example, for MVM, the NS-1 and NS-2 proteins (which are splice variants) may be expressed independently of one another. Likewise, for AAV, the p19 promoter may be inactivated and the large Rep protein(s) expressed from one polynucleotide and the small Rep protein(s) expressed from a different polynucleotide. Typically, however, it will be more convenient to express the replication proteins from a single construct. In some systems, the viral promoters (e.g., AAV p19 promoter) may not be recognized by the cell, and it is therefore necessary to express the large and small Rep proteins from separate expression cassettes. In other instances, it may be desirable to express the large Rep and small Rep proteins separately, i.e., under the control of separate transcriptional and/or translational control elements. For example, it may be desirable to control expression of the large Rep proteins, so as to decrease the ratio of large to small Rep proteins. In the case of insect cells, it may be advantageous to down-regulate expression of the large Rep proteins (e.g., Rep78/68) to avoid toxicity to the cells (see, e.g., Urabe et al., (2002) Human Gene Therapy 13:1935).

As used herein, the parvovirus or AAV "cap coding sequences" encode the structural proteins that form a functional parvovirus or AAV capsid (i.e., can package DNA and infect target cells). Typically, the cap coding sequences will encode all of the parvovirus or AAV capsid subunits, but less than all of the capsid subunits may be encoded as long as a functional capsid is produced. Typically, but not necessarily, the cap coding sequences will be present on a single nucleic acid molecule.

The capsid structure of autonomous parvoviruses and AAV are described in more detail in BERNARD N. FIELDS et al., VIROLOGY, volume 2, chapters 69 & 70 (4th ed., Lippincott-Raven Publishers).

By "substantially retain" a property, it is meant that at least about 75%, 85%, 90%, 95%, 97%, 98%, 99% or 100% of the property (e.g., activity or other measurable characteristic) is retained.

SUMF1 Expression Cassettes and Vectors

The present invention relates to the design of a SUMF1 expression cassette to provide therapeutic levels of expression of formylglycine-generating enzyme (FGE), the enzyme encoded by the SUMF1 gene, and the use of the expression cassette to achieve therapeutic levels of SUMF1 and/or FGE in a subject.

Thus, one aspect of the invention relates to a polynucleotide comprising a mammalian SUMF1 open reading frame (ORF), wherein the SUMF1 open reading frame has been codon-optimized for expression in mammalian cells. The term "mammal" as used herein includes, but is not limited to, humans, primates, non-human primates (e.g., monkeys and baboons), cattle, sheep, goats, pigs, horses, cats, dogs, rabbits, rodents (e.g., rats, mice, hamsters, and the like), etc. The open reading frame is the portion of the SUMF1 gene that encodes FGE. In some embodiments, the mammalian SUMF1 open reading frame may be a human SUMF1 open reading frame. As used herein, a mammalian SUMF1 ORF refers to a nucleotide sequence that encodes mammalian FGE, e.g., a human SUMF1 ORF refers to a nucleotide sequence that encodes a human FGE. Codon optimization is a technique well known in the art and optimal codons for expression in different species are known. The use of a codon-optimized SUMF1 sequence allows one to distinguish expression of the transduced sequence from expression of the endogenous SUMF1 sequence in a subject.

In some embodiments, the codon-optimized SUMF1 open reading frame encodes an FGE enzyme that is modified from the wild-type sequence, e.g., comprises, consists essentially of, or consists of an amino acid sequence in which 1, 2, 3, 4, or 5 residues have been substituted, added, and/or deleted compared to the wild-type amino acid sequence.

In some embodiments, the codon-optimized SUMF1 open reading frame comprises, consists essentially of, or consists of the nucleotide sequence of SEQ ID NO:1 or a sequence at least about 70% identical thereto, e.g., at least about 70, 75, 80, 85, 90, 91, 92, 93, 94, 95, 96, 97, 98, or 99% identical thereto.

Another aspect of the invention relates to an expression cassette comprising a polynucleotide comprising a human SUMF1 open reading frame. In certain embodiments, the polynucleotide is a human codon-optimized sequence, e.g., a polynucleotide comprising the nucleotide sequence of SEQ ID NO:1, or a sequence at least about 70% identical thereto, e.g., at least about 70, 75, 80, 85, 90, 91, 92, 93, 94, 95, 96, 97, 98, or 99% identical thereto.

The SUMF1 open reading frame in the expression cassette may be operably linked to one or more expression elements that may enhance expression of SUMF1 and/or FGE. In some embodiments, the polynucleotide is operably linked to a promoter, e.g., a chicken beta-actin promoter, e.g., a promoter comprising, consisting essentially of, or consisting of the nucleotide sequence of SEQ ID NO:2 or a sequence at least about 70% identical thereto, e.g., at least about 70, 75, 80, 85, 90, 91, 92, 93, 94, 95, 96, 97, 98, or 99% identical thereto. In some embodiments, the promoter further comprises the chimeric intron with chicken beta-actin splicing donor site and minute virus of mice (MVM) intron splicing acceptor site, e.g., comprising, consisting essentially of, or consisting of the nucleotide sequence of SEQ ID NO:3 or SEQ ID NO: 4, or a sequence at least about 70% identical thereto, e.g., at least about 70, 75, 80, 85, 90, 91, 92, 93, 94, 95, 96, 97, 98, or 99% identical thereto.

```
                                                   SEQ ID NO: 1
Human codon-optimized SUMF1 open reading frame
ATGGCCGCCCCAGCTCTTGGACTCGTGTGCGGAAGATGCCCTGAACTCGG

ACTCGTGTTGTTGTTGCTGCTGCTGTCCCTGCTGTGCGGCGCCGCCGGAT

CGCAAGAAGCGGGAACCGGAGCGGGTGCCGGATCCCTGGCCGGGTCCTGT

GGTTGCGGAACACCGCAACGGCCCGGCGCACATGGATCCAGCGCCGCTGC

GCACCGCTACTCCCGGGAAGCTAACGCCCCTGGGCCCGTGCCCGGGGAAA

GACAGCTCGCCCACTCCAAAATGGTGCCGATCCCCGCCGGAGTGTTCACT

ATGGGTACTGACGACCCACAGATTAAGCAGGACGGAGAGGCACCAGCGCG

CCGGGTCACCATTGACGCTTTTTACATGGACGCCTACGAGGTGTCAAACA

CTGAGTTCGAGAAGTTCGTGAACTCAACCGGATACCTGACCGAGGCCGAA

AAGTTCGGCGACTCGTTCGTGTTCGAGGGCATGCTGTCGGAACAAGTCAA

GACCAACATCCAGCAGGCCGTGGCTGCAGCCCCGTGGTGGCTGCCCGTGA

AGGGGGCCAATTGGAGACACCCCGAGGGCCCAGACTCCACCATCCTCCAC

CGGCCTGACCACCCTGTGCTTCACGTGTCCTGGAACGATGCAGTCGCATA

CTGCACCTGGGCCGGAAAGAGGCTGCCGACTGAAGCCGAATGGGAATACT

CCTGCCGGGGCGGCCTGCACAACCGCCTGTTTCCCTGGGGCAACAAGCTC

CAGCCTAAGGGCCAGCACTACGCGAACATTTGGCAGGGAGAATTCCCTGT

GACCAACACCGGAGAGGACGGTTTCCAAGGCACCGCCCCGGTCGATGCGT

TCCCGCCGAACGGTTACGGCCTCTACAACATCGTGGGGAACGCCTGGGAG

TGGACGTCGGATTGGTGGACCGTGCACCATAGCGTCGAAGAGACTCTGAA

CCCGAAAGGGCCCCCGAGCGGAAAGGACAGAGTGAAGAAGGGAGGCAGCT
```

```
                                                   -continued
ATATGTGTCATCGGTCCTACTGTTACCGCTACCGCTGCGCGGCCCGGAGC

CAGAATACTCCCGACTCTTCCGCGTCCAACCTGGGCTTCCGCTGCGCCGC

CGATAGGCTGCCTACCATGGAT.
```

```
                                                   SEQ ID NO: 2
Chicken beta-actin promoter
TACGTATTAGTCATCGCTATTACCATGGTCGAGGTGAGCCCCACGTTCTG

CTTCACTCTCCCCATCTCCCCCCCCTCCCCACCCCCAATTTTGTATTTAT

TTATTTTTTAATTATTTTGTGCAGCGATGGGGCGGGGGGGGGGGGGGG

CGCGCGCCAGGCGGGGCGGGGCGGGGCGAGGGGCGGGGCGGGGCGAGGCG

GAGAGGTGCGGCGGCAGCCAATCAGAGCGGCGCGCTCCGAAAGTTTCCTT

TTATGGCGAGGCGGCGGCGGCGGCGGCCCTATAAAAAGCGAAGCGCGCGG

CGGGCG.
```

```
                                                   SEQ ID NO: 3
Chimeric intron with chicken beta-actin splicing
donor site and minute virus of mice (MVM) intron
splicing acceptor site with A deletion
GGAGTCGCTGCGCGCTGCCTTCGCCCCGTGCCCCGCTCCGCCGCCGCCTC

GCGCCGCCCGCCCCGGCTCTGACTGACCGCGTTACTCCCACAGGTGAGCG

GGCGGGACGGCCCTTCTCCTCCGGGCTGTAATTAGC.
```

```
                                                   SEQ ID NO: 4
Chimeric intron with chicken beta-actin splicing
donor site and minute virus of mice (MVM) intron
splicing acceptor site
GGAGTCGCTGCGACGCTGCCTTCGCCCCGTGCCCCGCTCCGCCGCCGCCT

CGCGCCGCCCGCCCCGGCTCTGACTGACCGCGTTACTCCCACAGGTGAGC

GGGCGGGACGGCCCTTCTCCTCCGGGCTGTAATTAGC.
```

In some embodiments, the polynucleotide is operably linked to a promoter, e.g., a CAGGS promoter, e.g., a promoter comprising, consisting essentially of, or consisting of the nucleotide sequence of SEQ ID NO:5 or a sequence at least about 70% identical thereto, e.g., at least about 70, 75, 80, 85, 90, 91, 92, 93, 94, 95, 96, 97, 98, or 99% identical thereto.

SEQ ID NO: 5
CAGGS promoter 1.6kb CMV enhancer, CBA promoter
and partial 5' UTR
GATCTGAATTCGGATCTTCAATATTGGCCATTAGCCATATTATTCATTGG

TTATATAGCATAAATCAATATTGGATATTGGCCATTGCATACGTTGTATC

TATATCATAATATGTACATTTATATTGGCTCATGTCCAATATGACCGCCA

TGTTGGCATTGATTATTGACTAGTTATTAATAGTAATCAATTACGGGGTC

ATTAGTTCATAGCCCATATATGGAGTTCCGCGTTACATAACTTACGGTAA

ATGGCCCGCCTGGCTGACCGCCCAACGACCCCCGCCCATTGACGTCAATA

ATGACGTATGTTCCCATAGTAACGCCAATAGGGACTTTCCATTGACGTCA

ATGGGTGGAGTATTTACGGTAAACTGCCCACTTGGCAGTACATCAAGTGT

ATCATATGCCAAGTCCGCCCCCTATTGACGTCAATGACGGTAAATGGCCC

GCCTGGCATTATGCCCAGTACATGACCTTACGGGACTTTCCTACTTGGCA

GTACATCTACGTATTAGTCATCGCTATTACCATGGTCGAGGTGAGCCCCA

CGTTCTGCTTCACTCTCCCCATCTCCCCCCCCTCCCCACCCCCAATTTTG

TATTTATTTATTTTTTAATTATTTTGTGCAGCGATGGGGGCGGGGGGGGG

GGGGGGGCGCGCGCCAGGCGGGGCGGGGCGGGGCGAGGGCGGGGCGGGG

CGAGGCGGAGAGGTGCGGCGGCAGCCAATCAGAGCGGCGCGCTCCGAAAG

TTTCCTTTTATGGCGAGGCGGCGGCGGCGGCGGCCCTATAAAAAGCGAAG

CGCGCGGCGGGCGGGAGTCGCTGCGACGCTGCCTTCGCCCCGTGCCCCGC

TCCGCCGCCGCCTCGCGCCGCCCGCCCCGGCTCTGACTGACCGCGTTACT

CCCACAGGTGAGCGGGCGGGACGGCCCTTCTCCTCCGGGCTGTAATTAGC

GCTTGGTTTAATGACGGCTTGTTTCTTTTCTGTGGCTGCGTGAAAGCCTT

GAGGGGCTCCGGGAGGGCCCTTTGTGCGGGGGGAGCGGCTCGGGGGGTG

CGTGCGTGTGTGTGCGTGGGGAGCGCCGCGTGCGGCCCGCGCTGCCCG

GCGGCTGTGAGCGCTGCGGGCGCGGCGCGGGGCTTTGTGCGCTCCGCAGT

GTGCGCGAGGGGAGCGCGGCCGGGGCGGTGCCCGCGGTGCGGGGGGG

CTGCGAGGGGAACAAAGGCTGCGTGCGGGGTGTGTGCGTGGGGGGGTGAG

CAGGGGGTATGGGCGCGGCGGTCGGGCTGTAACCCCCCCCTGCACCCCCC

TCCCCGAGTTGCTGAGCACGGCCCGGCTTCGGGTGCGGGGCTCCGTACGG

GGCGTGGCGCGGGGCTCGCCGTGCCGGGCGGGGGTGGCGGCAGGTGGGG

GTGCCGGGCGGGCGGGCCGCCTCGGGCCGGGAGGGCTCGGGGGAGGG

GCGCGGCGGCCCCCGGAGCGCCGGCGGCTGTCGAGGCGCGGCGAGCCGCA

GCCATTGCCTTTTATGGTAATCGTGCGAGAGGGCGCAGGGACTTACTTTG

TCCCAAATCTGTGCGGAGCCGAAATCTGGGAGGCGCCGCCGCACCCCCTC

TAGCGGGCGCGGGCGAAGCGGTGCGGCGCCGGCAGGAAGGAAATGGGCG

GGGAGGGCCTTCGTGCGTCGCCGCGCCGCCGTCCCCTTCTCCCTCTCCAG

CCTCGGGGCTGTCCGCGGGGGGACGGCTGCCTTCGGGGGGACGGGGCAG

GGCGGGGTTCGGCTTCTGGCGTGTGACCGGCGGCTCTAGAGCCTCTGCTA

ACCATGTTCATGCCTTCTTCTTTTTCCTACAGCTCCTGGGCAACGTGCTG

GTTATTGTGCTGTCTCATCATTTTGGCAAAG.

In some embodiments, the polynucleotide is operably linked to an enhancer, e.g., a cytomegalovirus (CMV) enhancer, e.g., an enhancer comprising, consisting essentially of, or consisting of the nucleotide sequence of SEQ ID NO:6 or a sequence at least about 70% identical thereto, e.g., at least about 70, 75, 80, 85, 90, 91, 92, 93, 94, 95, 96, 97, 98, or 99% identical thereto.

SEQ ID NO: 6
CMV enhancer
TACATAACTTACGGTAAATGGCCCGCCTGGCTGACCGCCCAACGACCCCC

GCCCATTGACGTCAATAGTAACGCCAATAGGGACTTTCCATTGACGTCAA

TGGGTGGAGTATTTACGGTAAACTGCCCACTTGGCAGTACATCAAGTGTA

TCATATGCCAAGTACGCCCCCTATTGACGTCAATGACGGTAAATGGCCCG

CCTGGCATTGTGCCCAGTACATGACCTTATGGGACTTTCCTACTTGGCAG

TACATC.

In some embodiments, the SUMF1 open reading frame is operably linked to a polyadenylation signal, e.g., a synthetic polyadenylation signal, e.g., a polyadenylation signal comprising, consisting essentially of, or consisting of the nucleotide sequence of SEQ ID NO:7 or a sequence at least about 70% identical thereto, e.g., at least about 70, 75, 80, 85, 90, 91, 92, 93, 94, 95, 96, 97, 98, or 99% identical thereto. In some embodiments, the SUMF1 open reading frame is operably linked to a polyadenylation signal, e.g., a simian virus 40 (SV40) polyadenylation signal, e.g., a polyadenylation signal comprising, consisting essentially of, or consisting of the nucleotide sequence of SEQ ID NO:8 or SEQ ID NO:9, or a sequence at least about 70% identical thereto, e.g., at least about 70, 75, 80, 85, 90, 91, 92, 93, 94, 95, 96, 97, 98, or 99% identical thereto.

SEQ ID NO: 7
Synthetic polyadenylation signal (SpA)
AATAAAGAGCTCAGATGCATCGATCAGAGTGTGTTGGTTTTTTGTGTG.

SEQ ID NO: 8
SV40 polyadenylation signal (SV40pA)
AGACATGATAAGATACATTGATGAGTTTGGACAAACCACAACTAGAATGC

AGTGAAAAAAATGCTTTATTTGTGAAATTTGTGATGCTATTGCTTTATTT

GTAACCATTATAAGCTGCAATAAACAAGTTAACAACAACAATT.

SEQ ID NO: 9
SV40 polyadenylation signal (SV40pA)
TGTTTATTGCAGCTTATAATGGTTACAAATAAAGCAATAGCATCACAAAT

TTCACAAATAAAGCATTTTTTTCACTGCATTCTAGTTGTGGTTTGTCCAA

ACTCATCAATGTATCTTATCATG.

Those skilled in the art will further appreciate that a variety of promoter/enhancer elements may be used depending on the level and tissue-specific expression desired. The promoter/enhancer may be constitutive or inducible, depending on the pattern of expression desired. The promoter/enhancer may be native or foreign and can be a natural or a synthetic sequence. By foreign, it is intended that the transcriptional initiation region is not found in the wild-type host into which the transcriptional initiation region is introduced.

Promoter/enhancer elements can be native to the target cell or subject to be treated and/or native to the heterologous nucleic acid sequence. The promoter/enhancer element is generally chosen so that it will function in the target cell(s) of interest. In representative embodiments, the promoter/enhancer element is a mammalian promoter/enhancer element. The promoter/enhance element may be constitutive or inducible.

Inducible expression control elements are generally used in those applications in which it is desirable to provide regulation over expression of the heterologous nucleic acid sequence(s). Inducible promoters/enhancer elements for gene delivery can be tissue-specific or tissue-preferred promoter/enhancer elements, and include muscle specific or preferred (including cardiac, skeletal and/or smooth muscle), neural tissue specific or preferred (including brain-specific), eye (including retina-specific and cornea-specific), liver specific or preferred, bone marrow specific or preferred, pancreatic specific or preferred, spleen specific or preferred, and lung specific or preferred promoter/enhancer elements. Other inducible promoter/enhancer elements include hormone-inducible and metal-inducible elements. Exemplary inducible promoters/enhancer elements include, but are not limited to, a Tet on/off element, a RU486-inducible promoter, an ecdysone-inducible promoter, a rapamycin-inducible promoter, and a metallothionein promoter.

In embodiments wherein the SUMF1 open reading frame is transcribed and then translated in the target cells, specific initiation signals are generally employed for efficient translation of inserted protein coding sequences. These exogenous translational control sequences, which may include the ATG initiation codon (i.e., translation start site) and adjacent sequences, can be of a variety of origins, both natural and synthetic.

In certain embodiments, the expression cassette further comprises at least one adeno-associated virus (AAV) inverted terminal repeat (ITR), e.g., two AAV ITRs. The two ITRs may have the same nucleotide sequence or different nucleotide sequences. The AAV ITRs may be from any AAV serotype, e.g., AAV2. Each ITR independently may be the wild-type sequence or a modified sequence. In some embodiments, a modified ITR may have a D-element deletion (WO 01/92551). A D-element deletion is defined as the removal of that portion of the ITR known as the D-element. The D-element can be alternatively referred to or known as a D region, or D sequence, and/or the nucleotides of the ITR that do not form palindromic hairpin structures. In some embodiments, the expression cassette is an AAV genome, e.g., a self-complementary AAV genome.

In certain embodiments, the expression cassette comprises an enhancer, a promoter, a human SUMF1 open reading frame, and a polyadenylation site, optionally in the recited order. In certain embodiments, the expression cassette comprises an AAV ITR, an enhancer, a promoter, a human SUMF1 open reading frame, a polyadenylation site, and an AAV ITR, optionally in the recited order. In certain embodiments, the expression cassette comprises a CMV enhancer, a chicken beta actin promoter, a human SUMF1 open reading frame, and an SV40 polyadenylation site, optionally in the recited order. In certain embodiments, the expression cassette comprises an AAV ITR, a CMV enhancer, a chicken beta actin promoter, a human SUMF1 open reading frame, an SV40 polyadenylation site, and an AAV ITR, optionally in the recited order. In certain embodiments, the expression cassette comprises an AAV2 ITR, a CMV enhancer, a chicken beta actin promoter, a human SUMF1 open reading frame, an SV40 polyadenylation site, and an AA2V ITR, optionally in the recited order. In certain embodiments, the expression cassette comprises a wildtype AAV2 ITR, a CMV enhancer, a chicken beta actin promoter, a human SUMF1 open reading frame, an SV40 polyadenylation site, and a modified AA2V ITR, optionally in the recited order. The aforementioned components are in operable linkage.

In some embodiments, the expression cassette comprise, consists essentially of, or consists of the nucleotide sequence of SEQ ID NO:10 or a sequence at least about 70% identical thereto, e.g., at least about 70, 75, 80, 85, 90, 91, 92, 93, 94, 95, 96, 97, 98, or 99% identical thereto.

```
                                          SEQ ID NO: 10
Human SUMF1 expression cassette excluding ITRs
GGTTCGGTACCCGTTACATAACTTACGGTAAATGGCCCGCCTGGCTGACC

GCCCAACGACCCCCGCCCATTGACGTCAATAGTAACGCCAATAGGGACTT

TCCATTGACGTCAATGGGTGGAGTATTTACGGTAAACTGCCCACTTGGCA

GTACATCAAGTGTATCATATGCCAAGTACGCCCCCTATTGACGTCAATGA

CGGTAAATGGCCCGCCTGGCATTGTGCCCAGTACATGACCTTATGGGACT

TTCCTACTTGGCAGTACATCTACGTATTAGTCATCGCTATTACCATGGTC

GAGGTGAGCCCCACGTTCTGCTTCACTCTCCCCATCTCCCCCCCCTCCCC

ACCCCCAATTTTGTATTTATTTATTTTTTAATTATTTTGTGCAGCGATGG

GGGCGGGGGGGGGGGGGGCGCGCGCCAGGCGGGGCGGGGCGGGGCGAG

GGGCGGGGCGGGGCGAGGCGGAGAGGTGCGGCGGCAGCCAATCAGAGCGG

CGCGCTCCGAAAGTTTCCTTTTATGGCGAGGCGGCGGCGGCGGCGGCCCT

ATAAAAAGCGAAGCGCGCGGCGGGCGGGAGTCGCTGCGCGCTGCCTTCGC

CCCGTGCCCCGCTCCGCCGCCGCCTCGCGCCGCCCGCCCCGGCTCTGACT

GACCGCGTTACTCCCACAGGTGAGCGGGCGGGACGGCCCTTCTCCTCCGG

GCTGTAATTAGCTGAGCAAGAGGTAAGGGTTTAAGGGATGGTTGGTTGGT

GGGGTATTAATGTTTAATTACCTGGAGCACCTGCCTGAAATCACTTTTTT

TCAGGTTGGACCGGTTCCGGAGCCACCATGGCCGCCCCAGCTCTTGGACT

CGTGTGCGGAAGATGCCCTGAACTCGGACTCGTGTTGTTGTTGCTGCTGC

TGTCCCTGCTGTGCGGCGCCGCCGGATCGCAAGAAGCGGGAACCGGAGCG

GGTGCCGGATCCCTGGCCGGGTCCTGTGGTTGCGGAACACCGCAACGGCC

CGGCGCACATGGATCCAGCGCCGCTGCGCACCGCTACTCCCGGGAAGCTA

ACGCCCCTGGGCCCGTGCCCGGGGAAAGACAGCTCGCCCACTCCAAAATG

GTGCCGATCCCCGCCGGAGTGTTCACTATGGGTACTGACGACCCACAGAT

TAAGCAGGACGGAGAGGCACCAGCGCGCCGGGTCACCATTGACGCTTTTT

ACATGGACGCCTACGAGGTGTCAAACACTGAGTTCGAGAAGTTCGTGAAC

TCAACCGGATACCTGACCGAGGCCGAAAAGTTCGGCGACTCGTTCGTGTT

CGAGGGCATGCTGTCGGAACAAGTCAAGACCAACATCCAGCAGGCCGTGG

CTGCAGCCCCGTGGTGGCTGCCCGTGAAGGGGGCCAATTGGAGACACCCC

GAGGGCCCAGACTCCACCATCCTCCACCGGCCTGACCACCCTGTGCTTCA

CGTGTCCTGGAACGATGCAGTCGCATACTGCACCTGGGCCGGAAAGAGGC

TGCCGACTGAAGCCGAATGGGAATACTCCTGCCGGGGCGGCCTGCACAAC

CGCCTGTTTCCCTGGGGCAACAAGCTCCAGCCTAAGGGCCAGCACTACGC

GAACATTTGGCAGGGAGAATTCCCTGTGACCAACACCGGAGAGGACGGTT

TCCAAGGCACCGCCCCGGTCGATGCGTTCCCGCCGAACGGTTACGGCCTC

TACAACATCGTGGGGAACGCCTGGGAGTGGACGTCGGATTGGTGGACCGT

GCACCATAGCGTCGAAGAGACTCTGAACCCGAAAGGGCCCCCGAGCGGAA
```

-continued

```
AGGACAGAGTGAAGAAGGGAGGCAGCTATATGTGTCATCGGTCCTACTGT

TACCGCTACCGCTGCGCGGCCCGGAGCCAGAATACTCCCGACTCTTCCGC

GTCCAACCTGGGCTTCCGCTGCGCCGCCGATAGGCTGCCTACCATGGATT

GATAGGCGGCCGCGGAGCTCTCGAGAGACATGATAAGATACATTGATGAG

TTTGGACAAACCACAACTAGAATGCAGTGAAAAAAATGCTTTATTTGTGA

AATTTGTGATGCTATTGCTTTATTTGTAACCATTATAAGCTGCAATAAAC

AAGTTAACAACAACAATTACGCGT.
```

A further aspect of the invention relates to a vector comprising the polynucleotide or the expression cassette of the invention. Suitable vectors include, but are not limited to, a plasmid, phage, viral vector (e.g., an AAV vector, a lentiviral vector, an adenovirus vector, a herpesvirus vector, an alphavirus vector, or a baculovirus vector), bacterial artificial chromosome (BAC), or yeast artificial chromosome (YAC). For example, the nucleic acid can comprise, consist of, or consist essentially of an AAV vector comprising a 5' and/or 3' terminal repeat (e.g., 5' and/or 3' AAV terminal repeat). In some embodiments, the vector is a delivery vehicle such as a particle (e.g., a microparticle or nanoparticle) or a liposome to which the expression cassette is attached or in which the expression cassette is embedded. The vector may be any delivery vehicle suitable to carry the expression cassette into a cell.

In some embodiments, the vector is a viral vector, e.g., a lentiviral vector and/or an AAV vector. The AAV vector may be any AAV serotype, e.g., AAV9. In some embodiments, the AAV vector may comprise wild-type capsid proteins. In other embodiments, the AAV vector may comprise a modified capsid protein with altered tropism compared to a wild-type capsid protein, e.g., a modified capsid protein is liver-detargeted or has enhanced tropism for particular cells.

In some embodiments, the vector is a single-stranded AAV (ssAAV) vector. In some embodiments, the vector is a self-complementary or duplexed AAV (scAAV) vector. scAAV vectors are described in international patent publication WO 01/92551 (the disclosure of which is incorporated herein by reference in its entirety). Use of scAAV to express the SUMF1 ORF may provide an increase in the number of cells transduced, the copy number per transduced cell, or both.

An additional aspect of the invention relates to a transformed cell comprising the polynucleotide, expression cassette, and/or vector of the invention. In some embodiments, the polynucleotide, expression cassette, and/or vector is stably incorporated into the cell genome. The cell may be an in vitro, ex vivo, or in vivo cell.

Another aspect of the invention relates to a transgenic animal comprising the polynucleotide, expression cassette, vector, and/or the transformed cell of the invention. In some embodiments, the animal is a laboratory animal, e.g., a mouse, rat, rabbit, dog, monkey, or non-human primate.

A further aspect of the invention relates to a pharmaceutical formulation comprising the polynucleotide, expression cassette, vector, and/or transformed cell of the invention in a pharmaceutically acceptable carrier.

In a specific embodiment, the polynucleotide, expression cassette, vector, and/or transformed cell of the invention is isolated.

In another specific embodiment, the polynucleotide, expression cassette, vector, and/or transformed cell of the invention is purified.

Methods of Producing Virus Vectors

The present invention further provides methods of producing virus vectors. In one particular embodiment, the present invention provides a method of producing a recombinant AAV particle, comprising providing to a cell permissive for AAV replication: (a) a recombinant AAV template comprising (i) the polynucleotide or expression cassette of the invention, and (ii) an ITR; (b) a polynucleotide comprising Rep coding sequences and Cap coding sequences; under conditions sufficient for the replication and packaging of the recombinant AAV template; whereby recombinant AAV particles are produced in the cell. Conditions sufficient for the replication and packaging of the recombinant AAV template can be, e.g., the presence of AAV sequences sufficient for replication of the AAV template and encapsidation into AAV capsids (e.g., AAV rep sequences and AAV cap sequences) and helper sequences from adenovirus and/or herpesvirus. In particular embodiments, the AAV template comprises two AAV ITR sequences, which are located 5' and 3' to the polynucleotide of the invention, although they need not be directly contiguous thereto.

In some embodiments, the recombinant AAV template comprises an ITR that is not resolved by Rep to make duplexed AAV vectors as described in international patent publication WO 01/92551.

The AAV template and AAV rep and cap sequences are provided under conditions such that virus vector comprising the AAV template packaged within the AAV capsid is produced in the cell. The method can further comprise the step of collecting the virus vector from the cell. The virus vector can be collected from the medium and/or by lysing the cells.

The cell can be a cell that is permissive for AAV viral replication. Any suitable cell known in the art may be employed. In particular embodiments, the cell is a mammalian cell (e.g., a primate or human cell). As another option, the cell can be a trans-complementing packaging cell line that provides functions deleted from a replication-defective helper virus, e.g., 293 cells or other Ela trans-complementing cells.

The AAV replication and capsid sequences may be provided by any method known in the art. Current protocols typically express the AAV rep/cap genes on a single plasmid. The AAV replication and packaging sequences need not be provided together, although it may be convenient to do so. The AAV rep and/or cap sequences may be provided by any viral or non-viral vector. For example, the rep/cap sequences may be provided by a hybrid adenovirus or herpesvirus vector (e.g., inserted into the Ela or E3 regions of a deleted adenovirus vector). EBV vectors may also be employed to express the AAV cap and rep genes. One advantage of this method is that EBV vectors are episomal, yet will maintain a high copy number throughout successive cell divisions (i.e., are stably integrated into the cell as extra-chromosomal elements, designated as an "EBV based nuclear episome," see Margolski, (1992) Curr. Top. Microbiol. Immun. 158: 67).

As a further alternative, the rep/cap sequences may be stably incorporated into a cell.

Typically the AAV rep/cap sequences will not be flanked by the TRs, to prevent rescue and/or packaging of these sequences.

The AAV template can be provided to the cell using any method known in the art. For example, the template can be supplied by a non-viral (e.g., plasmid) or viral vector. In particular embodiments, the AAV template is supplied by a herpesvirus or adenovirus vector (e.g., inserted into the Ela or E3 regions of a deleted adenovirus). As another illustration, Palombo et al., (1998) *J. Virology* 72:5025, describes a baculovirus vector carrying a reporter gene flanked by the AAV TRs. EBV vectors may also be employed to deliver the template, as described above with respect to the rep/cap genes.

In another representative embodiment, the AAV template is provided by a replicating rAAV virus. In still other embodiments, an AAV provirus comprising the AAV template is stably integrated into the chromosome of the cell.

To enhance virus titers, helper virus functions (e.g., adenovirus or herpesvirus) that promote a productive AAV infection can be provided to the cell. Helper virus sequences necessary for AAV replication are known in the art. Typically, these sequences will be provided by a helper adenovirus or herpesvirus vector. Alternatively, the adenovirus or herpesvirus sequences can be provided by another non-viral or viral vector, e.g., as a non-infectious adenovirus miniplasmid that carries all of the helper genes that promote efficient AAV production as described by Ferrari et al., (1997) *Nature Med.* 3:1295, and U.S. Pat. Nos. 6,040,183 and 6,093,570.

Further, the helper virus functions may be provided by a packaging cell with the helper sequences embedded in the chromosome or maintained as a stable extrachromosomal element. Generally, the helper virus sequences cannot be packaged into AAV virions, e.g., are not flanked by ITRs.

Those skilled in the art will appreciate that it may be advantageous to provide the AAV replication and capsid sequences and the helper virus sequences (e.g., adenovirus sequences) on a single helper construct. This helper construct may be a non-viral or viral construct. As one nonlimiting illustration, the helper construct can be a hybrid adenovirus or hybrid herpesvirus comprising the AAV rep/cap genes.

In one particular embodiment, the AAV rep/cap sequences and the adenovirus helper sequences are supplied by a single adenovirus helper vector. This vector can further comprise the AAV template. The AAV rep/cap sequences and/or the AAV template can be inserted into a deleted region (e.g., the E1a or E3 regions) of the adenovirus.

In a further embodiment, the AAV rep/cap sequences and the adenovirus helper sequences are supplied by a single adenovirus helper vector. According to this embodiment, the AAV template can be provided as a plasmid template.

In another illustrative embodiment, the AAV rep/cap sequences and adenovirus helper sequences are provided by a single adenovirus helper vector, and the AAV template is integrated into the cell as a provirus. Alternatively, the AAV template is provided by an EBV vector that is maintained within the cell as an extrachromosomal element (e.g., as an EBV based nuclear episome).

In a further exemplary embodiment, the AAV rep/cap sequences and adenovirus helper sequences are provided by a single adenovirus helper. The AAV template can be provided as a separate replicating viral vector. For example, the AAV template can be provided by an AAV particle or a second recombinant adenovirus particle.

According to the foregoing methods, the hybrid adenovirus vector typically comprises the adenovirus 5' and 3' cis sequences sufficient for adenovirus replication and packaging (i.e., the adenovirus terminal repeats and PAC sequence). The AAV rep/cap sequences and, if present, the AAV template are embedded in the adenovirus backbone and are flanked by the 5' and 3' cis sequences, so that these sequences may be packaged into adenovirus capsids. As described above, the adenovirus helper sequences and the AAV rep/cap sequences are generally not flanked by ITRs so that these sequences are not packaged into the AAV virions.

Zhang et al. (200 *J. Gene Ther.* 18:704-12) describe a chimeric helper comprising both adenovirus and the AAV rep and cap genes.

Herpesvirus may also be used as a helper virus in AAV packaging methods. Hybrid herpesviruses encoding the AAV Rep protein(s) may advantageously facilitate scalable AAV vector production schemes. A hybrid herpes simplex virus type I (HSV-1) vector expressing the AAV-2 rep and cap genes has been described (Conway et al., 1999 *Gene Ther.* 6:986 and WO 00/17377).

As a further alternative, the virus vectors of the invention can be produced in insect cells using baculovirus vectors to deliver the rep/cap genes and AAV template as described, for example, by Urabe et al., 2002 *Human Gene Ther.* 13:1935-43.

AAV vector stocks free of contaminating helper virus may be obtained by any method known in the art. For example, AAV and helper virus may be readily differentiated based on size. AAV may also be separated away from helper virus based on affinity for a heparin substrate (Zolotukhin et al. 1999 *Gene Therapy* 6:973). Deleted replication-defective helper viruses can be used so that any contaminating helper virus is not replication competent. As a further alternative, an adenovirus helper lacking late gene expression may be employed, as only adenovirus early gene expression is required to mediate packaging of AAV. Adenovirus mutants defective for late gene expression are known in the art (e.g., is 100K and ts149 adenovirus mutants).

Methods of Using SUMF1 Vectors

The present invention also relates to methods for delivering a SUMF1 ORF to a cell or a subject to increase production of SUMF1 and/or FGE, e.g., for therapeutic or research purposes in vitro, ex vivo, or in vivo. Thus, one aspect of the invention relates to a method of expressing a SUMF1 open reading frame in a cell, comprising contacting the cell with the polynucleotide, expression cassette, and/or the vector of the invention, thereby expressing the SUMF1 open reading frame in the cell. In some embodiments, the cell is an in vitro cell, an ex vivo cell, or an in vivo cell. Expression of the present invention in vitro may be beneficial for research purposes, e.g., to evaluate efficacy and/or safety, prior to expression in vivo.

Another aspect of the invention relates to a method of expressing a SUMF1 open reading frame in a subject, comprising delivering to the subject the polynucleotide, expression cassette, vector, and/or transformed cell of the invention, thereby expressing the SUMF1 open reading frame in the subject. In some embodiments, the subject is an animal model of a disorder associated with aberrant SUMF1 gene expression.

A further aspect of the invention relates to a method of treating a disorder associated with aberrant expression of a SUMF1 gene or aberrant activity of a SUMF1 gene product (e.g., FGE) in a subject in need thereof, comprising delivering to the subject a therapeutically effective amount of the polynucleotide, expression cassette, vector, and/or transformed cell of the invention, thereby treating the disorder associated with aberrant expression of the SUMF1 gene or aberrant activity of a SUMF1 gene product in the subject. The invention provides a method of treating a disorder associated with aberrant expression of a SUMF1 gene or aberrant activity of a SUMF1 gene product (e.g., FGE) in a subject in need thereof, comprising administering to the subject a therapeutically effective amount of the polynucleotide, the expression cassette, vector, and/or transformed cell of the invention, such that the SUMF1 open reading frame is expressed in the subject. In some embodiments, the disorder associated with expression of the SUMF1 gene or gene product may be neonatal MSD. In some embodiments, the disorder associated with expression of the SUMF1 gene or gene product may be severe late infantile MSD. In some embodiments, the disorder associated with expression of the SUMF1 gene or gene product may be mild late infantile MSD. In some embodiments, the disorder associated with expression of the SUMF1 gene or gene product may be juvenile MSD. In some embodiments, the disorder associated with expression of the SUMF1 gene or gene product may be adult-onset MSD.

The invention further provides a method of treating MSD in a subject in need thereof, comprising administering to the subject a therapeutically effective amount of the polynucleotide, the expression cassette, vector, and/or transformed cell of the invention, such that the SUMF1 open reading frame is expressed in the subject.

In some embodiments, the methods of the present invention further comprise administering to the subject a bone marrow transplant (BMT), e.g., prior to administering the effective amount of a polynucleotide, expression cassette, vector, and/or transformed cell of the present invention. Techniques for performing BMT (referred to interchangeably as a hematopoietic stem cell transplant (HSCT)) are well known to those of skill in the art, and are routine for clinicians in the treatment of subjects (e.g., patients, e.g., human patients) in need thereof. The skilled clinician can readily determine the proper regimen to be used for performing BMT based on factors including the age and condition of the subject, type of disease being treated, stage of the disease, patient size, and the like.

In certain embodiments, the polynucleotide, expression cassette, vector, and/or transformed cell is delivered to the subject, e.g., systemically (e.g., intravenously) or directly to the central nervous system (e.g., to the cerebrospinal fluid by intrathecal or intraventricular injection) of the subject. In some embodiments, the polynucleotide, expression cassette, vector, and/or transformed cell is delivered intravenously. In some embodiments, the polynucleotide, expression cassette, vector, and/or transformed cell is delivered intracerebroventricularly.

Recombinant virus vectors according to the present invention find use in both veterinary and medical applications. Suitable subjects include both avians and mammals. The term "avian" as used herein includes, but is not limited to, chickens, ducks, geese, quail, turkeys, pheasant, parrots, parakeets. The term "mammal" as used herein includes, but is not limited to, humans, primates, non-human primates (e.g., monkeys and baboons), cattle, sheep, goats, pigs, horses, cats, dogs, rabbits, rodents (e.g., rats, mice, hamsters, and the like), etc. Human subjects include neonates, infants, juveniles, and adults. Optionally, the subject is "in need of" the methods of the present invention, e.g., because the subject has or is believed at risk for a disorder including those described herein or that would benefit from the delivery of a polynucleotide including those described herein. As a further option, the subject can be a laboratory animal and/or an animal model of disease. Preferably, the subject is a human.

In certain embodiments, the polynucleotide of the invention is administered to a subject in need thereof as early as possible in the life of the subject, e.g., as soon as the subject is diagnosed with aberrant SUMF1 and/or FGE expression or activity or any of the above-mentioned diseases or disorders. In some embodiments, the polynucleotide is administered to a newborn subject, e.g., after newborn screening has identified aberrant SUMF1 and/or FGE expression or activity. In some embodiments, the polynucleotide is administered to a subject prior to the age of 5 years, e.g., prior to 1, 2, 3, 4, or 5 years of age. In some embodiments, the polynucleotide is administered to a fetus in utero, e.g., after prenatal screening has identified aberrant SUMF1 and/or FGE expression or activity or the presence of one of the above-mentioned diseases or disorders. In some embodiments, the polynucleotide is administered to a subject as soon as the subject develops symptoms associated with aberrant SUMF1 and/or FGE expression or activity or is suspected or diagnosed as having aberrant SUMF1 and/or FGE expression or activity or one of the above-mentioned diseases or disorders. In some embodiments, the polynucleotide is administered to a subject before the subject develops symptoms associated with aberrant SUMF1 and/or FGE expression or activity or disease/disorder, e.g., a subject that is suspected or diagnosed as having aberrant SUMF1 and/or FGE expression or activity or one of the above-mentioned diseases or disorders but has not started to exhibit symptoms.

In particular embodiments, the present invention provides a pharmaceutical composition comprising a polynucleotide, expression cassette, vector, and/or transformed cell of the invention in a pharmaceutically acceptable carrier and, optionally, other medicinal agents, pharmaceutical agents, stabilizing agents, buffers, carriers, adjuvants, diluents, etc. For injection, the carrier will typically be a liquid. For other methods of administration, the carrier may be either solid or liquid. For inhalation administration, the carrier will be respirable, and will preferably be in solid or liquid particulate form. In some embodiments, a pharmaceutical carrier may be D-sorbitol (e.g., PBS 5% w/v D-sorbitol).

By "pharmaceutically acceptable" it is meant a material that is not toxic or otherwise undesirable, i.e., the material may be administered to a subject without causing any undesirable biological effects.

One aspect of the present invention is a method of transferring a SUMF1 ORF to a cell in vitro. The polynucleotide, expression cassette, and/or vector of the invention may be introduced to the cells in the appropriate amount. The virus vector may be introduced to the cells at the appropriate multiplicity of infection according to standard transduction methods appropriate for the particular target cells. Titers of the virus vector or capsid to administer can vary, depending upon the target cell type and number, and the particular virus vector or capsid, and can be determined by those of skill in the art without undue experimentation. In particular embodiments, at least about $10^3$ infectious units, more preferably at least about $10^5$ infectious units are introduced to the cell.

The cell(s) into which the polynucleotide, expression cassette, and/or vector of the invention, e.g., virus vector, can be introduced may be of any type, including but not limited to neural cells (including cells of the peripheral and central nervous systems, in particular, brain cells such as neurons, oligodendrocytes, glial cells, astrocytes), lung cells, cells of the eye (including retinal cells, retinal pigment epithelium, and corneal cells), epithelial cells (e.g., gut and respiratory epithelial cells), skeletal muscle cells (including myoblasts, myotubes and myofibers), diaphragm muscle cells, dendritic cells, pancreatic cells (including islet cells), hepatic cells, a cell of the gastrointestinal tract (including smooth muscle cells, epithelial cells), heart cells (including cardiomyocytes), bone cells (e.g., bone marrow stem cells), hematopoietic stem cells, spleen cells, keratinocytes, fibroblasts, endothelial cells, prostate cells, joint cells (including, e.g., cartilage, meniscus, synovium and bone marrow), germ cells, and the like. Alternatively, the cell may be any progenitor cell. As a further alternative, the cell can be a stem cell (e.g., neural stem cell, liver stem cell). As still a further alternative, the cell may be a cancer or tumor cell. Moreover, the cells can be from any species of origin, as indicated above.

The polynucleotide, expression cassette, and/or vector of the invention, e.g., virus vector, may be introduced to cells in vitro for the purpose of administering the modified cell to a subject. In particular embodiments, the cells have been removed from a subject, the polynucleotide, expression cassette, and/or vector of the invention, e.g., virus vector, is introduced therein, and the cells are then replaced back into the subject. Methods of removing cells from subject for treatment ex vivo, followed by introduction back into the subject are known in the art (see, e.g., U.S. Pat. No. 5,399,346). Alternatively, the polynucleotide, expression cassette, and/or vector of the invention, e.g., virus vector, is introduced into cells from another subject, into cultured cells, or into cells from any other suitable source, and the cells are administered to a subject in need thereof.

Suitable cells for ex vivo gene therapy are as described above. Dosages of the cells to administer to a subject will vary upon the age, condition and species of the subject, the type of cell, the nucleic acid being expressed by the cell, the mode of administration, and the like. Typically, at least about $10^2$ to about $10^8$ or about $10^3$ to about $10^6$ cells will be administered per dose in a pharmaceutically acceptable carrier. In particular embodiments, the cells transduced with the virus vector ex vivo are administered to the subject in an effective amount in combination with a pharmaceutical carrier.

A further aspect of the invention is a method of administering the polynucleotide, expression cassette, and/or vector of the invention, e.g., virus vector, to a subject. In particular embodiments, the method comprises a method of delivering a SUMF1 ORF to an animal subject, the method comprising: administering an effective amount of a virus vector according to the invention to an animal subject. Administration of the virus vectors of the present invention to a human subject or an animal in need thereof can be by any means known in the art. Optionally, the virus vector is delivered in an effective dose in a pharmaceutically acceptable carrier.

Dosages of the virus vectors to be administered to a subject will depend upon the mode of administration, the disease or condition to be treated, the individual subject's condition, the particular virus vector, and the nucleic acid to be delivered, and can be determined in a routine manner. Exemplary doses for achieving therapeutic effects are virus titers of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, or $10^{15}$, $10^{16}$ transducing units or more, e.g., about $10^7$, $10^8$, $10^9$, $10^{10}$ or $10^{11}$, $10^{12}$, $10^{13}$, $10^{14}$, $10^{15}$ transducing units, yet more preferably about $10^{10}$, $10^{11}$, $10^{12}$, $10^{13}$, $10^{14}$, or $10^{15}$ transducing units (TU). Doses and virus titer transducing units may be calculated as vector or viral genomes (vg), and/or vg/kg of the subject.

In particular embodiments, more than one administration (e.g., two, three, four or more administrations) may be employed to achieve the desired level of gene expression over a period of various intervals, e.g., daily, weekly, monthly, yearly, etc.

Exemplary modes of administration include oral, rectal, transmucosal, topical, intranasal, inhalation (e.g., via an aerosol), buccal (e.g., sublingual), vaginal, intrathecal, intraocular, transdermal, in utero (or in ovo), parenteral (e.g., intravenous, subcutaneous, intradermal, intramuscular [including administration to skeletal, diaphragm and/or cardiac muscle], intradermal, intrapleural, intracerebral, and intraarticular), topical (e.g., to both skin and mucosal surfaces, including airway surfaces, and transdermal administration), intro-lymphatic, and the like, as well as direct tissue or organ injection (e.g., to liver, skeletal muscle, cardiac muscle, diaphragm muscle or brain). Administration can also be to a tumor (e.g., in or a near a tumor or a lymph node). The most suitable route in any given case will depend on the nature and severity of the condition being treated and on the nature of the particular vector that is being used. In some embodiments, more than one mode and/or route of administration may be utilized, for example, e.g., intraparenchymal administration and intracerebroventricular administration.

In some embodiments, the viral vector is administered to the CNS, the peripheral nervous system, or both. In some embodiments, the viral vector is administered directly to the CNS, e.g., the brain or the spinal cord. Direct administration can result in high specificity of transduction of CNS cells, e.g., wherein at least 80%, 85%, 90%, 95% or more of the transduced cells are CNS cells. Any method known in the art to administer vectors directly to the CNS can be used. The vector may be introduced into the spinal cord, brainstem (medulla oblongata, pons), midbrain (hypothalamus, thalamus, epithalamus, pituitary gland, substantia nigra, pineal gland), cerebellum, telencephalon (corpus striatum, cerebrum including the occipital, temporal, parietal and frontal lobes, cortex, basal ganglia, hippocampus and amygdala), limbic system, neocortex, corpus striatum, cerebrum, and inferior colliculus. The vector may also be administered to different regions of the eye such as the retina, cornea or optic nerve. The vector may be delivered into the cerebrospinal fluid (e.g., by lumbar puncture) for more disperse administration of the vector.

The delivery vector may be administered to the desired region(s) of the CNS by any route known in the art, including but not limited to, intrathecal, intracerebral, intraventricular, intraparenchymal, intranasal, intra-aural, intraocular (e.g., intra-vitreous, sub-retinal, anterior chamber) and peri-ocular (e.g., sub-Tenon's region) delivery or any combination thereof.

The delivery vector may be administered in a manner that produces a more widespread, diffuse transduction of tissues, including the CNS, the peripheral nervous system, and/or other tissues.

Typically, the viral vector will be administered in a liquid formulation by direct injection (e.g., stereotactic injection) to the desired region or compartment in the CNS and/or other tissues. In some embodiments, the vector can be delivered via a reservoir and/or pump. In other embodiments, the vector may be provided by topical application to the desired region or by intra-nasal administration of an aerosol formulation. Administration to the eye or into the ear, may be by topical application of liquid droplets. As a further alternative, the vector may be administered as a solid, slow-release formulation. Controlled release of parvovirus and AAV vectors is described by international patent publication WO 01/91803.

Injectables can be prepared in conventional forms, either as liquid solutions or suspensions, solid forms suitable for solution or suspension in liquid prior to injection, or as emulsions. Alternatively, one may administer the virus vector in a local rather than systemic manner, for example, in a depot or sustained-release formulation. Further, the virus vector can be delivered dried to a surgically implantable matrix such as a bone graft substitute, a suture, a stent, and the like (e.g., as described in U.S. Pat. No. 7,201,898).

Pharmaceutical compositions suitable for oral administration can be presented in discrete units, such as capsules, cachets, lozenges, or tablets, each containing a predetermined amount of the composition of this invention; as a powder or granules; as a solution or a suspension in an aqueous or non-aqueous liquid; or as an oil-in-water or water-in-oil emulsion. Oral delivery can be performed by complexing a virus vector of the present invention to a carrier capable of withstanding degradation by digestive enzymes in the gut of an animal. Examples of such carriers include plastic capsules or tablets, as known in the art. Such formulations are prepared by any suitable method of pharmacy, which includes the step of bringing into association the composition and a suitable carrier (which may contain one or more accessory ingredients as noted above). In general, the pharmaceutical composition according to embodiments of the present invention are prepared by uniformly and intimately admixing the composition with a liquid or finely divided solid carrier, or both, and then, if necessary, shaping the resulting mixture. For example, a tablet can be prepared by compressing or molding a powder or granules containing the composition, optionally with one or more accessory ingredients. Compressed tablets are prepared by compressing, in a suitable machine, the composition in a free-flowing form, such as a powder or granules optionally mixed with a binder, lubricant, inert diluent, and/or surface active/dispersing agent(s). Molded tablets are made by molding, in a suitable machine, the powdered compound moistened with an inert liquid binder.

Pharmaceutical compositions suitable for buccal (sublingual) administration include lozenges comprising the composition of this invention in a flavored base, usually sucrose and acacia or tragacanth; and pastilles comprising the composition in an inert base such as gelatin and glycerin or sucrose and acacia.

Pharmaceutical compositions suitable for parenteral administration can comprise sterile aqueous and non-aqueous injection solutions of the composition of this invention, which preparations are optionally isotonic with the blood of the intended recipient. These preparations can contain antioxidants, buffers, bacteriostats and solutes, which render the composition isotonic with the blood of the intended recipient. Aqueous and non-aqueous sterile suspensions, solutions and emulsions can include suspending agents and thickening agents. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives may also be present such as, for example, antimicrobials, anti-oxidants, chelating agents, and inert gases and the like.

The compositions can be presented in unit/dose or multi-dose containers, for example, in sealed ampoules and vials, and can be stored in a freeze-dried (lyophilized) condition requiring only the addition of the sterile liquid carrier, for example, saline or water-for-injection immediately prior to use.

Extemporaneous injection solutions and suspensions can be prepared from sterile powders, granules and tablets of the kind previously described. For example, an injectable, stable, sterile composition of this invention in a unit dosage form in a sealed container can be provided. The composition can be provided in the form of a lyophilizate, which can be reconstituted with a suitable pharmaceutically acceptable carrier to form a liquid composition suitable for injection into a subject. The unit dosage form can be from about 1 μg to about 10 grams of the composition of this invention. When the composition is substantially water-insoluble, a sufficient amount of emulsifying agent, which is physiologically acceptable, can be included in sufficient quantity to emulsify the composition in an aqueous carrier. One such useful emulsifying agent is phosphatidyl choline.

Pharmaceutical compositions suitable for rectal administration can be presented as unit dose suppositories. These can be prepared by admixing the composition with one or more conventional solid carriers, such as for example, cocoa butter and then shaping the resulting mixture.

Pharmaceutical compositions of this invention suitable for topical application to the skin can take the form of an ointment, cream, lotion, paste, gel, spray, aerosol, or oil. Carriers that can be used include, but are not limited to, petroleum jelly, lanoline, polyethylene glycols, alcohols, transdermal enhancers, and combinations of two or more thereof. In some embodiments, for example, topical delivery can be performed by mixing a pharmaceutical composition of the present invention with a lipophilic reagent (e.g., DMSO) that is capable of passing into the skin.

Pharmaceutical compositions suitable for transdermal administration can be in the form of discrete patches adapted to remain in intimate contact with the epidermis of the subject for a prolonged period of time. Compositions suitable for transdermal administration can also be delivered by iontophoresis (see, for example, *Pharm. Res.* 3:318 (1986)) and typically take the form of an optionally buffered aqueous solution of the composition of this invention. Suitable formulations can comprise citrate or bis\tris buffer (pH 6) or ethanol/water and can contain from 0.1 to 0.2M active ingredient.

The virus vectors disclosed herein may be administered to the lungs of a subject by any suitable means, for example, by administering an aerosol suspension of respirable particles comprised of the virus vectors, which the subject inhales. The respirable particles may be liquid or solid. Aerosols of liquid particles comprising the virus vectors may be produced by any suitable means, such as with a pressure-driven aerosol nebulizer or an ultrasonic nebulizer, as is known to those of skill in the art. See, e.g., U.S. Pat. No. 4,501,729. Aerosols of solid particles comprising the virus vectors may likewise be produced with any solid particulate medicament aerosol generator, by techniques known in the pharmaceutical art.

Having described the present invention, the same will be explained in greater detail in the following examples, which are included herein for illustration purposes only, and which are not intended to be limiting to the invention.

EXAMPLES

Example 1: SUMF1 Species Comparison

A codon-optimized (amino acids do not change) human SUMF1 sequence for AAV9-mediated delivery was developed. The hSUMF1opt was compared to the mouse, rat and monkey using the Clustal sequence alignment program. The comparison of the sequences with the signal peptide removed indicates a high-level of identity between the sequences as shown in FIG. 1. Based on the high degree of conservation, it is highly unlikely that SUMF1 will have an altered biological activity in rodents versus primates.

Example 2: AAV9/SUMF1 Construct Design

AAV9/SUMF1 is a recombinant serotype 9 adeno-associated virus (AAV) encoding a codon-optimized human SUMF1 transgene (hSUMF1opt). AAV serotype 9 vector is capable of widespread transduction (tissue tropism), including the central nervous system (CNS) and somatic system (body) following intravenous or intracerebrospinal fluid administration. The CNS and systemic tropisms of AAV9 make it ideal for treating lysosomal storage diseases with global organ disease manifestations. Codon optimization of the DNA sequence modifies the sequence such that the final amino acid sequence is unchanged but nucleotide sequence is altered for easier detection along with potentially stronger expression. The final product consists of AAV9 capsids that are packaged with the self-complementary AAV genome comprising a mutant AAV2 inverted terminal repeat (ITR) with the D element deleted, the "CBh" promoter (796 kb CMV enhancer, chicken beta actin promoter, synthetic intron (Gray et al. 2011 *Human Gene Therapy* 22(9):1134-1153)), codon-optimized human SUMF1 DNA coding sequence (1122 bp), the simian virus 40 polyadenylation signal (143 bp), and WT AAV2 ITR. The CBh promoter is identical to the construct utilized and characterized in rodents, pigs, and non-human primates (Federici et al. 2011 *Gene Ther.* 19(8):852-859; Gray et al. 2011 *Mol. Ther.* 19(6):1058-1069). The CBh promoter and SV40 polyA are utilized for their ability to both be small in size as well as drive strong expression allowing for packaging into a self-complementary (sc) AAV vector. The upstream inverted terminal repeat (ITR; proximal to the promoter) is from AAV2, with the D element deleted to promote packaging of a sc genome. The downstream ITR (proximal to the polyA) is an intact WT AAV2 ITR. Self-complementary scAAV vectors are 10-100 times more efficient at transduction compared to traditional single-stranded AAV vectors (McCarty et al. 2003 *Gene Ther.* 10:2112-2118; McCarty et al. 2001 *J. Gene Ther.* 8:1248-1254). The final product consists of a solution of AAV9/SUMF1 in phosphate-buffered saline with 5% D-sorbitol.

Example 3: Mouse In Vivo MSD Rescue Studies

The present study was performed using a mouse model of SUMF1 deficiency. Settembre et. al. generated a Sumf1 knock out mouse model (Settembre et al. 2007 *PNAS* 104(11); 4506-4511; Spampanato et al. 2011) where the sulfatase activities are completely absent in Sumf1−/− mice. These mice display severe developmental, neurological, behavioral and histopathological deficits starting in the first week. The mice are smaller compared to wildtype mice, including slower overall growth, flattened facial features, shorter limbs, and smaller skull, with severe kyphosis, spinal vertebral and joint deficits and seizures and tremors. While severe, the phenotype reported in these mice is consistent with the development of pathology from defects in SUMF1. This model is representative of the most severe form of MSD in human populations, the neonatal presentation.

Figure 3A:
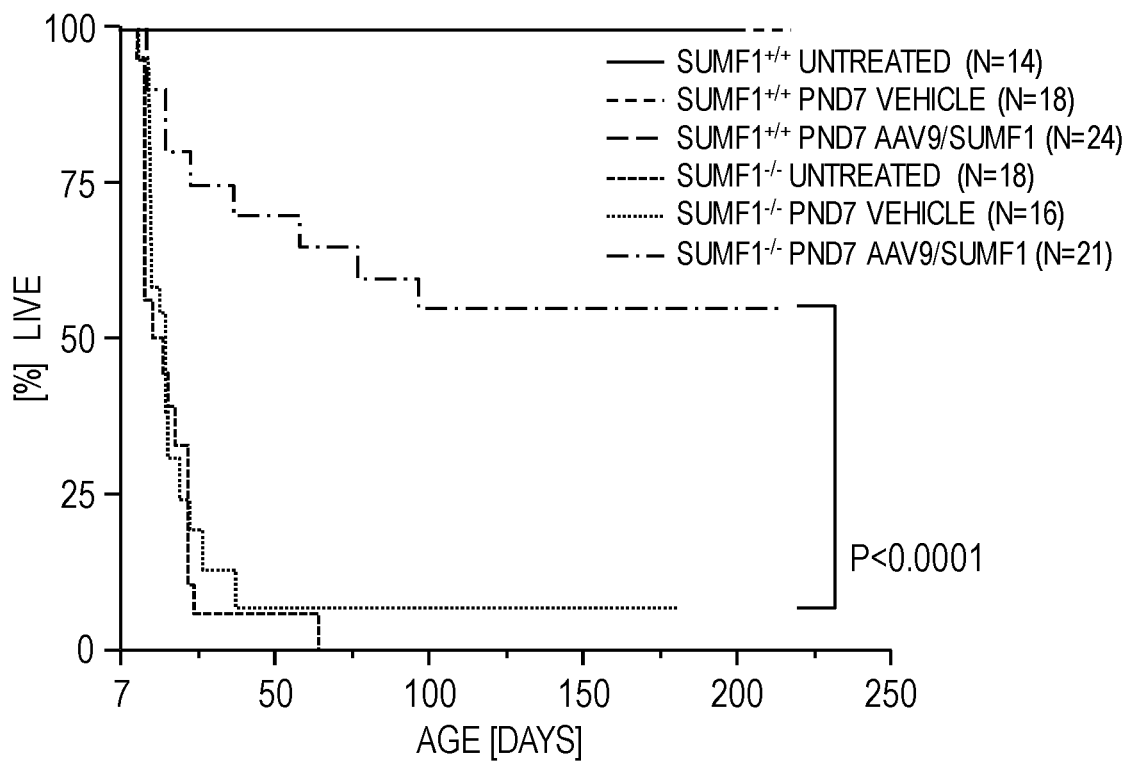
FIGS. 3A-3B show AAV9/SUMF1 therapy in symptomatic Sumf1−/− mice improves survival. Sumf1−/− and Sumf1+/+ mice received a single dose of AAV9/SUMF1 via IT on PND7. Control cohorts did not receive any dosing or received a single dose of vehicle.

A colony of Sumf1−/− mice was established at the Jackson Laboratory, Bar Harbor, ME wherein proof-of-concept and therapeutic interventions with AAV9/SUMF1 are being executed. Sumf1−/− mice are able to survive until 5 days of age and approximately 30% survive to 20 days (FIGS. 2A and 3A). Wild-type mice are used to compare the performance of the treatment where untreated KO mice are not available due to their short lifespan.

The age of disease onset in individuals with SUMF1 mutations is at birth or within the first few years. Earliest possible intervention is expected to be the most beneficial, due to the rapid neurodegenerative properties of the disease. The preclinical model has an early lethality phenotype, so the intervention window is limited. Survival and adverse events are a measure of therapeutic benefit and safety endpoints for risk analysis following the treatment.

TABLE 5

Mouse model efficacy studies.

| | Mice/group | | Age/Disease | | | AAV9/SUMF1 | Dose/mouse |
| Study Goal | Male | Female | status | Sumf1 | Route | Dose level | (vg × $10^{11}$) |
| --- | --- | --- | --- | --- | --- | --- | --- |
| Efficacy AAV9/ SUMF1 | ≥5 | ≥5 | P1 Neonate | +/+ | — | — | — |
| | | | | −/− | — | — | — |
| | | | | | ICV | Vehicle | — |
| | | | | | | Maximum* | 2.8 |
| Efficacy and Safety AAV9/ SUMF1 | ≥5 | ≥5 | P7 Symptomatic | +/+ | — | — | — |
| | | | | | IT | Vehicle | — |
| | | | | | | Maximum** | 7 |
| | | | | −/− | — | — | — |
| | | | | | IT | Vehicle | — |
| | | | | | | Maximum** | 7 |

*Maximum feasible dose for ICV route only.
**Maximum feasible dose for IT route only.

Intervention is at PND1 and PND7 as outlined above in Table 5. Treatment included 6 cohorts: 1) Untreated Sumf1+/+ mice represent a healthy cohort, 2) AAV9/SUMF1-injected Sumf1+/+ mice represent a non-disease phenotype to monitor safety of the gene therapy, 3) AAV9/SUMF1-injected Sumf1−/− mice to investigate the efficacy and safety of the gene therapy, 4) untreated administered Sumf1−/− mice to represent the natural course of the disease and 5) vehicle treated Sumf1+/+ and 6) vehicle treated Sumf1−/− mice to monitor any effects from injection technique. Age groups are as follows:

PND1 (Neonatal intervention): The data from this cohort is expected to provide a proof-of-concept for the therapy, demonstrating the highest efficacy. The route of administration for this cohort is intracerebroventricular (ICV), as a proof-of-concept. Note that these mice receive a dose of $2.8 \times 10^{11}$ vg (approximately $2.8 \times 10^{11}$ vg/kg).

PND7 (Delayed intervention): This cohort represents intervention following the detection of MSD disease signs in the mice and evaluation of long term safety data, using the IT route of administration. Note that these mice receive a dose of $7 \times 10^{11}$ vg.

Figure 2B:
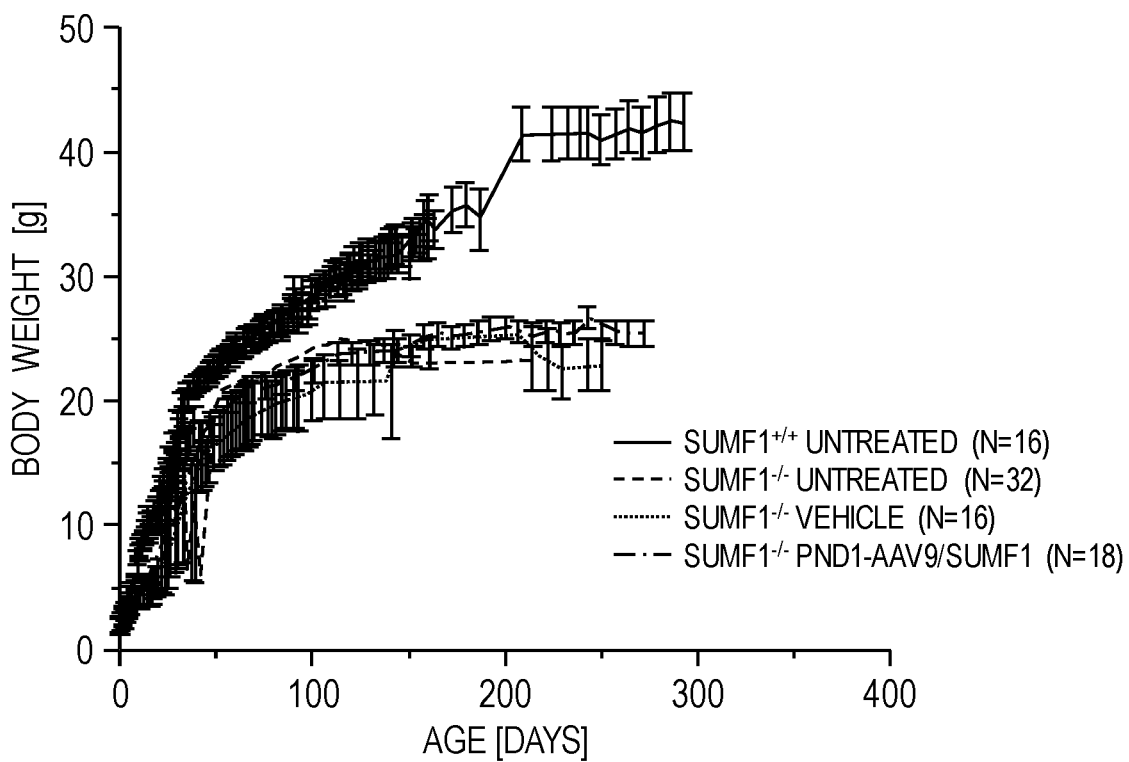
Figure 3B:
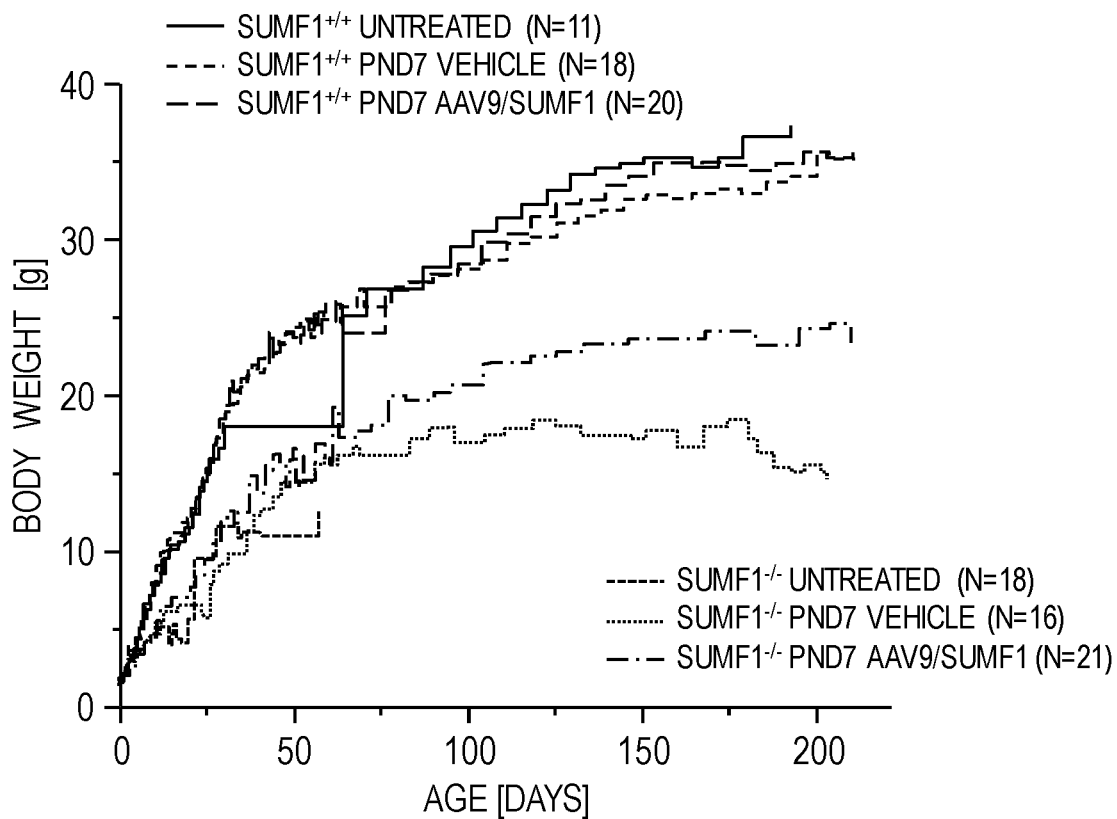

The survival data for these cohorts and the body weights are presented in FIGS. 2A-2B and FIGS. 3A-3B. The untreated Sumf1 KO cohort had ~50% mortality on PND10 and 6% of mice survived past Day 40 with eventual 100% lethality. Mice that received AAV9/SUMF1 on PND1 had significantly better survival with greater than 75% of mice surviving past Day 40 and over 50% of mice surviving beyond 300 days, so far (FIG. 2A). Mice that received AAV9/SUMF1 on PND7 also had significantly better survival with 70% of mice surviving past Day 40 and great than 50% of mice surviving beyond 200 days, so far (FIG. 3A). The treated mice gained weight gradually with a growth curve similar to their wild-type littermates, but at a slower pace (FIGS. 2B and 3B). No signs of tremors or seizures were detected, or signs of kyphosis. The treated mice retain cranio-facial abnormalities, which may be due to underlying bone deformities during development. The improved survival is likely from resolution of underlying pathology as evidenced by lack of physical deformities (besides facial dismorphometry) and clinical signs including seizures in these mice. In addition, no overt adverse events were observed in Sumf1−/− or littermate control mice when treated with the vector and the injection technique did not negatively impact vehicle treated mice.

All references cited herein are incorporated herein by reference in their entireties and for all purposes to the same extent as if each individual publication or patent or patent application was specifically and individually indicated to be incorporated by reference in its entirety for all purposes.

The foregoing examples are illustrative of the present invention, and are not to be construed as limiting thereof. Although the invention has been described in detail with reference to preferred embodiments, variations and modifications exist within the scope and spirit of the invention as described and defined in the following claims.

What is claimed is:

1. A polynucleotide comprising a human SUMF1 open reading frame, wherein the human SUMF1 open reading frame is codon-optimized for expression in a human cell and comprises the nucleotide sequence of SEQ ID NO: 1 or a nucleotide sequence having at least about 90% identity thereto.

2. An expression cassette comprising the polynucleotide of claim 1.

3. The expression cassette of claim 2, wherein the human SUMF1 open reading frame is operably linked to a promoter, an enhancer and/or a polyadenylation signal.

4. The expression cassette of claim 3, wherein the promoter is a chicken beta actin promoter, wherein the polyadenylation signal is a simian virus 40 (SV40) polyadenylation signal, and/or wherein the enhancer is a cytomegalovirus (CMV) enhancer.

5. The expression cassette of claim 3, further comprising at least one adeno-associated virus (AAV) inverted terminal repeat (ITR).

6. The expression cassette of claim 5, wherein the expression cassette comprises two AAV ITRs.

7. The expression cassette of claim 6, wherein one of the two AAV ITRs is a modified ITR.

8. The expression cassette of claim 6, wherein the expression cassette is a self-complementary AAV genome.

9. The expression cassette of claim 2, wherein the expression cassette comprises a promoter, the human SUMF1 open reading frame, and a polyadenylation site.

10. The expression cassette of claim 9, wherein the expression cassette comprises an AAV ITR, a promoter, the human SUMF1 open reading frame, a polyadenylation site, and an AAV ITR.

11. The expression cassette of claim 10, wherein the expression cassette comprises an AAV ITR, a CMV enhancer, a chicken beta actin promoter, the human SUMF1 open reading frame, an SV40 polyadenylation site, and an AAV ITR.

12. The expression cassette of claim 11, wherein the expression cassette comprises an AAV2 ITR, a CMV enhancer, a chicken beta actin promoter, the human SUMF1 open reading frame, an SV40 polyadenylation site, and an AAV2 ITR.

13. The expression cassette of claim 12, comprising the nucleotide sequence of SEQ ID NO: 10 or a sequence at least about 90% identical thereto.

14. A vector comprising the polynucleotide of claim 1.

15. The vector of claim 14, wherein the vector is an AAV vector.

16. A pharmaceutical composition comprising the polynucleotide of claim 1 in a pharmaceutically acceptable carrier.

17. A method of expressing a SUMF1 open reading frame in a subject, comprising delivering to the subject the pharmaceutical composition of claim 16, thereby expressing the SUMF1 open reading frame in the subject.

18. A method of treating a disorder associated with aberrant expression of a SUMF1 gene or aberrant activity of a SUMF1 gene product in a subject in need thereof, comprising administering to the subject a therapeutically effective amount of the pharmaceutical composition of claim 16, such that the SUMF1 open reading frame is expressed in the subject.

19. A method of treating multiple sulfatase deficiency (MSD) in a subject in need thereof, comprising administering to the subject a therapeutically effective amount of the pharmaceutical composition of claim 16, such that the SUMF1 open reading frame is expressed in the subject.

* * * * *